US009418814B2

(12) United States Patent
Sumant et al.

(10) Patent No.: US 9,418,814 B2
(45) Date of Patent: Aug. 16, 2016

(54) PLANAR FIELD EMITTERS AND HIGH EFFICIENCY PHOTOCATHODES BASED ON ULTRANANOCRYSTALLINE DIAMOND

(71) Applicant: UChicago Argonne, LLC, Chicago, IL (US)

(72) Inventors: Anirudha V. Sumant, Plainfield, IL (US); Sergey V. Baryshev, Lemont, IL (US); Sergey P. Antipov, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 14/594,949

(22) Filed: Jan. 12, 2015

(65) Prior Publication Data

US 2016/0203937 A1 Jul. 14, 2016

(51) Int. Cl.

*C01B 31/06* (2006.01)
*H01J 1/304* (2006.01)
*H01J 9/02* (2006.01)
*H01J 9/12* (2006.01)
*H01J 1/34* (2006.01)

(52) U.S. Cl.

CPC . *H01J 1/304* (2013.01); *H01J 1/34* (2013.01); *H01J 9/025* (2013.01); *H01J 9/12* (2013.01); *H01J 2201/30457* (2013.01); *H01J 2201/3421* (2013.01)

(58) Field of Classification Search

CPC ............ H01J 1/304; H01J 9/025; H01J 9/12; H01J 1/34
USPC ........................................................ 438/105
See application file for complete search history.

(56) References Cited

U.S. PATENT DOCUMENTS 7,556,982 B2 * 7/2009 Carlisle ................. C23C 16/274 438/105
9,108,888 B2 * 8/2015 Neogi ................... C04B 41/009
2002/0041154 A1 4/2002 Tomasetti et al.
2003/0001498 A1 1/2003 Niigaki et al.
2006/0131588 A1 * 6/2006 Gruen ................... C23C 16/274 257/77
2007/0220959 A1 * 9/2007 Sumant .................. B82Y 35/00 73/105
2010/0051964 A1 * 3/2010 Lin ..................... H01L 29/1602 257/77

(Continued)

OTHER PUBLICATIONS

Baryshev, et al., "Planar ultrananocrystalline diamond field emitter in accelerator radio frequency electron injector: Performance metrics," Applied Physics Letters, vol. 105, No. 203505 (2014), pp. 203505-1-203505-5.

(Continued)

*Primary Examiner* — Tracie Y Green
(74) *Attorney, Agent, or Firm* — Foley & Lardner LLP

(57) ABSTRACT

A method of forming a field emitter comprises disposing a first layer on a substrate. The first layer is seeded with nano-diamond particles. The substrate with the first layer disposed thereon is maintained at a first temperature and a first pressure in a mixture of gases which includes nitrogen. The first layer is exposed to a microwave plasma to form a nitrogen doped ultrananocrystalline diamond film on the first layer, which has a percentage of nitrogen in the range of about 0.05 atom % to about 0.5 atom %. The field emitter has about $10^{12}$ to about $10^{14}$ emitting sites per $cm^2$. A photocathode can also be formed similarly by forming a nitrogen doped ultrananocrystalline diamond film on a substrate similar to the field emitter, and then hydrogen terminating the film. The photocathode is responsive to near ultraviolet light as well as to visible light.

29 Claims, 15 Drawing Sheets

(56) References Cited

U.S. PATENT DOCUMENTS

| | | | |
|---|---|---|---|
| 2010/0052112 A1 | 3/2010 | Rogers et al. |
| 2013/0082241 A1 | 4/2013 | Kub et al. |
| 2013/0145857 A1 | 6/2013 | Bryant et al. |
| 2013/0320295 A1 | 12/2013 | Rao et al. |
| 2013/0333094 A1 | 12/2013 | Rogers et al. |

OTHER PUBLICATIONS

Grimes, Jacob T., "A Prototype Diamond Amplified Photocathode", Master of Science Thesis, Stony Brook University, May 2007, pp. ii-102.

Perez, et al., "High quantum efficiency ultrananocrystalline diamond photocathode for photoinjector applications," Applied Physics Letters, vol. 105 (2014) pp. 123103-1-123103-4.

Rameau, et al., "Properties of Hydrogen Terminated Diamond as a Photocathode", Physical Review Letters, Abstract, vol. 106, Issue 137602,(Mar. 30, 2011), 4 pages.

Sumant,et al., "High Quantum Efficiency Photocathodes Based on Ultrananocrystalline Diamond Operating Between 250 nm and Visible Blue", Slide Presentation, by Argonne and U.S. Department of Energy, Nov. 24, 2014,p. 1-7.

Tremsin & Siegmund, "Polycrystalline diamond films as prospective UV photocathodes," Proceedings SPIE, vol. 4139, (2000), pp. 1-9.

Gaowei, Responsive Study of Diamond X-Ray Monitors with nUNCD Contact Proc. of IPAC 2015, Jun. 2015, pp. 1273-1275.

Ex Parte Quayle Action for U.S. Appl. No. 14/601,908, mailed Mar. 30, 2016, 9 pages.

Notice of Allowance on U.S. Appl. No. 14/601908, mailed May 9, 2016, 7 pages.

Notice of Allowance for U.S. Appl. No. 14/790,995, mailed Jun. 24, 2016, 12 pages.

* cited by examiner

PLANAR FIELD EMITTERS AND HIGH EFFICIENCY PHOTOCATHODES BASED ON ULTRANANOCRYSTALLINE DIAMOND

This invention was made with government support in part under "Experimental Program to Stimulate Competitive Research (EPSCoR)" Program Award Number NNX13AB222A awarded by the National Aeronautical and Space Administration (NASA), under "Space Grant" Program Award Number NNX10AM80H awarded by NASA, and under "Small Business Innovation Research (SBIR)" Program Award Number DE-SC0009572 by the Department of Energy (DOE). The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to the field of electron emitters including field emitters and photocathodes.

BACKGROUND

Electron emitters are devices that emit electrons when subjected to external stimuli. Field emitters are devices that produce electrons under the influence of an electric field. Field emitters are used as an electron source in a variety of applications such as e-beam lithography, scanning electron microscopy, electron accelerators, X-ray sources, etc. Electron emitters already find applications in electron-linear accelerator (linac) factories for molybdenum-99 (Mo-99) production for nuclear medicine to rule out weapons grade uranium from the production cycle, or compact bright inverse Compton sources for basic science research and semiconductor lithography.

Conventional field emitters are generally shaped in the form of sharp tips (e.g., wires, cones, pyramids, etc.) having tip diameter or otherwise cross-section in the order of few tens of nanometers. Such conventional field emitters rely on micro- or nano-lithography and additional transfer steps for fabrication. These make it cumbersome, e.g., to scale field emitter size to tens or hundreds of millimeters or to use substrates of different form-factors and/or curvatures. Many industrial applications require normal conducting or superconducting radio frequency (RF) systems to deliver beam power of 10 kW to 100 kW at electron energy of 10 MeV to 50 MeV for which currents of 1 mAmp to 10 mAmps are needed. Many field emitters are capable of producing such currents. However, accelerator electron injectors pose some challenging and unique requirements. For instance: 1) requiring mechanical and electrical strength which does not poison niobium superconducting resonators; 2) low turn-on electric fields and high rise of current-voltage characteristic to yield significant currents in low gradient conditions; and 3) simplicity of a field emitter is also a key matter for servicing and small downtime.

Similarly, photocathodes are electron emitters that emit electrons when exposed to photons due to photoelectric effect. Photocathodes are a key component of photo-injectors in synchrotron sources, free electron lasers, linacs and ultrafast electron systems for imaging and diffraction. Conventional photocathodes have either low efficiency and are stable against air exposures (e.g., copper) or have high efficiency but are unstable against poor vacuum ($>10^{-9}$-10-8 Torr) and air exposures (e.g., alkali based materials). Such high efficiency alkali photocathodes thus have to be maintained at ultrahigh vacuum (i.e., significantly less than $10^{-9}$ Torr) for operation. Exposure to higher pressures degrades alkali photocathodes and halts photoemission.

SUMMARY

Embodiments described herein relate generally to electron emitters and in particular to nitrogen doped ultrananocrystalline diamond (N-UNCD) based field emitters, and hydrogen terminated N-UNCD (N-UNCD:H) based photocathodes which are operable at pressures of up to about $10^{-5}$ Torr.

In some embodiments, a method of forming a field emitter comprises disposing a first layer on a substrate. The first layer is seeded with nanodiamond particles. The substrate with the seeded first layer disposed thereon is maintained at a first temperature and a first pressure in a mixture of gases which includes nitrogen. The first layer is exposed to a microwave plasma to form a N-UNCD film on the first layer. The N-UNCD has a percentage of nitrogen in the range of about 0.05 atom % to about 0.5 atom %. Furthermore, the field emitter has about $10^{12}$ to about $10^{14}$ emitting sites per $cm^2$. In particular embodiment, the first layer includes molybdenum and the substrate includes stainless steel.

In other embodiments, a method of forming a photocathode comprises disposing a first layer on a substrate. The first layer is seeded with nanodiamond particles. The substrate with the first layer disposed thereon is maintained at a first temperature and a first pressure in a mixture of gases which includes nitrogen. The first layer is exposed to a microwave plasma to form a N-UNCD film on the first layer. The N-UNCD film has a percentage of nitrogen in the range of about 0.05 atom % to about 0.5 atom %. The N-UNCD films is maintained at a second temperature and second pressure in hydrogen gas and exposes to a microwave plasma to hydrogen terminate the N-UNCD and form an N-UNCD:H film disposed on the substrate.

In still other embodiment, a field emitter, comprises a planar substrate and a first layer disposed on the planar substrate. A N-UNCD film is disposed on the first layer and has a percentage of nitrogen in the range of about 0.05 atom % to about 0.5 atom %. Furthermore, the field emitter has about $10^{12}$ to about $10^{14}$ emitting sites per $cm^2$. In particular embodiments, the substrate is formed from stainless steel. The field emitter is operable to a pressure of up to about $10^{-8}$ Torr.

In yet other embodiments, a photocathode comprises a substrate and a first layer disposed on the substrate. A N-UNCD:H film is disposed on the first layer and has a percentage of nitrogen in the range of about 0.05 atom % to about 0.5 atom %. In particular embodiments, the N-UNCD:H film has a quantum efficiency of at least $10^{-3}$ electrons/photons at wavelengths in the range of about 240 nm to about 270 nm, and at least $5\times10^{-8}$ electrons/photon in a visible wavelength range of about 405 nm to 436 nm, respectively.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 7 panel B is a YAG1 image of an electron beam from the planar N-UNCD field emitter of FIG. 3; and FIG. 7 panel C is YAG1 image of the electron beam panel B but now, projected on a downstream YAG2 screen.

FIG. 8 panel B is a plot of field emission characteristics (charge per RF pulse and peak current versus surface electric field) of the N-UNCD field emitter of FIG. 3 after a dark current (shown as dark solid circles in panel A) from a copper bore edge was subtracted.

Figure 1:
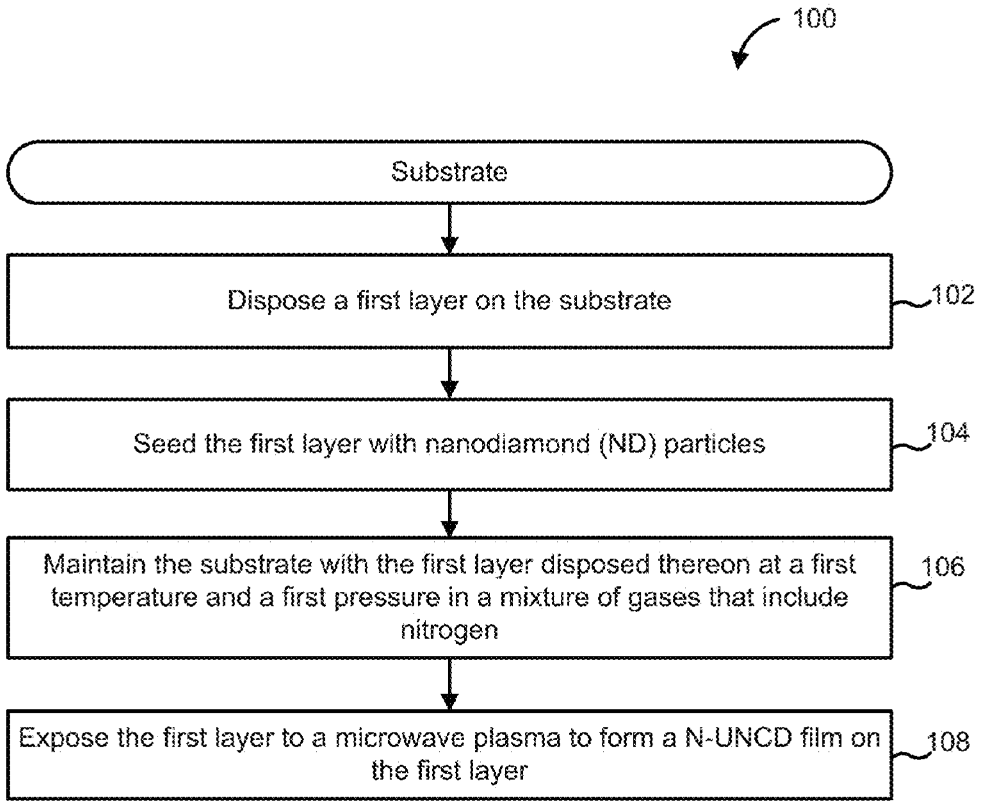
FIG. 1 is a schematic flow diagram of an exemplary method of forming a field emitter, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to electron emitters and in particular to N-UNCD based field emitters and N-UNCD:H based photocathodes which are operable at pressures of up to about $10^{-5}$-$10^{-6}$ Torr.

Embodiments of the field emitters and photocathodes described herein provide several benefits including, for example: (1) allowing forming of planar field emission cathodes (FEC) which avoids any lithography and transfer steps, and can be scaled from a few millimeters to a wafer-scale process (150-200 mm diameter) thus possibly making FECs based on UNCD a true commodity electron source; (2) providing robust, low cost, and efficient electron source; (3) providing enhanced stability; (4) forming field emitters and photocathodes on metal substrates e.g., stainless steel allowing mass production and economic viability; (5) having stability in air; (6) operable at moderate vacuum pressures up to about $10^{-5}$ Torr; (7) having substantially higher field emitting sites relative to conventional field emitters; (8) demonstrating excellent quantum yield in the visible range; and (9) ability to restore quantum efficiency of the photocathode by heating in a hydrogen environment for a few minutes.

As used herein, the term "ultra nanocrystalline diamond (UNCD)" refers to crystalline diamond that has a grain size in the range of 2 nm to 10 nm.

FIG. 1 is schematic flow diagram of an exemplary method 100 for forming a field emitter. The method 100 includes disposing a first layer on a substrate, at 102. The substrate can include metals or metal alloys such as, for example, stainless steel, niobium, molybdenum, tungsten, gold, platinum, alloys, any other suitable material or a combination thereof. In one embodiment, the substrate can include stainless steel. Use of the stainless steel substrate can yield a stable field emitter which can be mass produced, and is relatively cheap. The substrate can have any suitable shape or size. For example, the substrate can include a cylinder, a disc, a block, etc., and can have any suitable cross-section, for example circular, square, rectangular, oval, polygonal, an asymmetric shape or any other shape. In particular embodiments, the substrate is planar. In such embodiments, the field emitter is planar. In other embodiments, the substrate can be microstructure or nanostructured.

In some embodiments, the first layer includes a transition metal such as, for example, molybdenum (Mo), titanium (Ti), tungsten (W), tantalum (Ta), niobium (Nb), rhenium (Rh), ruthenium (Ru), any other suitable transition metal or a combination thereof. In one embodiment, the first layer can include Mo, for example, a polycrystalline Mo buffer layer. The first layer can be disposed on the substrate using any suitable method such as sputtering, e-beam deposition, electroplating, any other suitable method or a combination thereof. Furthermore, the first layer can have any suitable thickness, for example about 50 nm to a few microns.

In another embodiment, the first layer can include niobium. Use of niobium can allow fabrication of field emitters which can serve as a superconducting electron source for superconducting RF linacs operating at temperatures in the range of 2 Kelvin to 4 Kelvin. Field emission from such a source can deliver monochromatic and/or monoenergetic electron beams.

The first layer is seeded with nanodiamond (ND) particles, at 104. The ND particles can be in the form of a slurry and have a size in the range of about 1 nm to about 20 nm (e.g., about 1 nm, 2 nm, 4 nm, 6 nm, 8 nm, 10 nm, 12 nm, 14 nm, 16 nm, 18 nm or about 20 nm inclusive of all ranges or values therebetween) although larger sized ND particles can also be used (e.g., up to about 100 nm). In one embodiment, seeding is performed by immersing the substrate with the first layer disposed thereon in a slurry of the ND particles and sonication (e.g., in an ultrasonic bath) for a predetermined period of time. The ND particles promote rapid nucleation and growth of an N-UNCD film on the first layer disposed over the stainless steel substrate or directly on the substrate if it is made of a transition metal.

The substrate with the first layer disposed thereon is maintained at a first temperature and a first pressure in a mixture of gases that include nitrogen, at 106. In some embodiments, the pre-seeded substrate with the first layer disposed thereon can be disposed in a chamber (e.g., a microwave plasma chemical vapor deposition (MPCVD) chamber). The substrate is heated to the first temperature which can be in the range of about 650 degrees Celsius to about 950 degrees Celsius (e.g., 650 degrees Celsius, 700 degrees Celsius, 750 degrees Celsius, 800 degrees Celsius, 850 degrees Celsius, 900 degrees Celsius or about 950 degrees Celsius inclusive of all ranges and values therebetween). Furthermore, the first pressure can be in the range of about 40 Torr to about 70 Torr (e.g., about 40 Torr, 45 Torr, 50 Torr, 55 Torr, 60 Torr, 65 Torr or about 70 Torr inclusive of all ranges and values therebetween).

As described before the mixture of gases includes nitrogen. In one embodiment, the mixture of gases includes methane, argon and nitrogen. In some embodiments, amount of nitrogen in the mixture can be in a range of about 5 vol % to about 20 vol %.

The first layer is exposed to a microwave plasma to form a N-UNCD film on the first layer, at 108. In some embodiments, the microwave plasma can be produced using a microwave plasma source (e.g., having a frequency of about 915 MHz). Any suitable power can be applied on the plasma source to produce the microwave plasma, for example a power in the range of about 2 kW to about 3 kW (e.g., 2 kW, 2.2 kW, 2.4 kW, 2.6 kW, 2.8 kW or about 3 kW inclusive of all ranges and values therebetween).

The N-UNCD thin film formed using the method 100 has a percentage of nitrogen in the range of about 0.05 atom % to about 0.5 atom % (e.g., 0.06 atom %, 0.07 atom %, 0.08 atom %, 0.09 atom %, 0.1 atom %, 0.12 atom %, 0.14 atom %, 0.16 atom %, 0.18 atom %, 0.2 atom %, 0.25 atom %, 0.3 atom %, 0.35 atom %, 0.4 atom %, 0.45 atom % or about 0.5 atom % inclusive of all ranges and values therebetween. The N-UNCD film can have any suitable thickness, for example in the range of about 30 nm to about 1 micron.

In this manner, a field emitter that includes N-UNCD film disposed on a substrate, for example a planar stainless steel substrate can be formed. Moreover, the field emitter formed using method 100 has about $10^{12}$ to about $10^{14}$ emitting sites (also referred to herein as "emitting grain boundaries") per $cm^2$. In some embodiments, a carrier concentration in the N-UNCD can be about $10^{20}$ per $cm^3$.

The N-UNCD film can have a current density in the range of about 0.1 mAmp/$cm^2$ to about 25 mAmp/$cm^2$ (e.g., about 0.1 mAmp/$cm^2$, 0.3 mAmp/$cm^2$, 0.5 mAmp/$cm^2$, 0.7 mAmp/$cm^2$, 0.9 mAmp/$cm^2$, 1 mAmp/$cm^2$, 2 mAmp/$cm^2$, 3 mAmp/$cm^2$, 4 mAmp/$cm^2$, 5 mAmp/$cm^2$, 10 mAmp/$cm^2$, 15 mAmp/$cm^2$, 20 mAmp/$cm^2$, or about 25 mAmp/$cm^2$ inclusive of all ranges and values therebetween) between an electric field gradient of about 45 MV/m to about 65 MV/m. In some embodiments, the current can be higher at a higher electric field or if N-UNCD is deposited onto a high aspect ratio substrates.

In other embodiments, the N-UNCD film and thereby, the field emitter formed by the method 100 can have a beam emittance (i.e., an electron beam emittance) in the range about 0.5 mm×mrad/mm-rms to about 3 mm×mrad/mm-rms (e.g., about 0.5. 1, 1.5, 2, 2.5 or about 3 mm×mrad/mm-rms inclusive of all ranges and values therebetween). In still other embodiments, the N-UNCD film and thereby, the field emitter formed by the method 100 can have a beam emittance smaller than or equal to 0.5 mm×mrad/mm-rms (e.g., about 0.1, 0.2, 0.3, 0.4 or 0.49 mm×mrad/mm-rms inclusive of all ranges and values therebetween).

In further embodiments, N-UNCD film and therefore the field emitter has a full width half maximum (FWHM) longitudinal energy spread of about 0.5% to about 1% (e.g. about 0.5%, 0.6%, 0.7%, 0.8%, 0.9% or about 1.0% inclusive of all ranges and values therebetween) at a nominal electron energy of 2 MeV. Moreover, the field emitter formed using the method 100 can be operable at pressures of up to about $10^{-8}$ Torr.

Furthermore, the field emitter formed using the method 100 can be operable by a RF source. This enables simplification of the architecture of RF electron guns. The field emitter can be used in various versatile applications including, for example electron-linac factories, inverse Compton sources for basic science, semi-conductor lithography, cargo inspection, etc.

Figure 2:
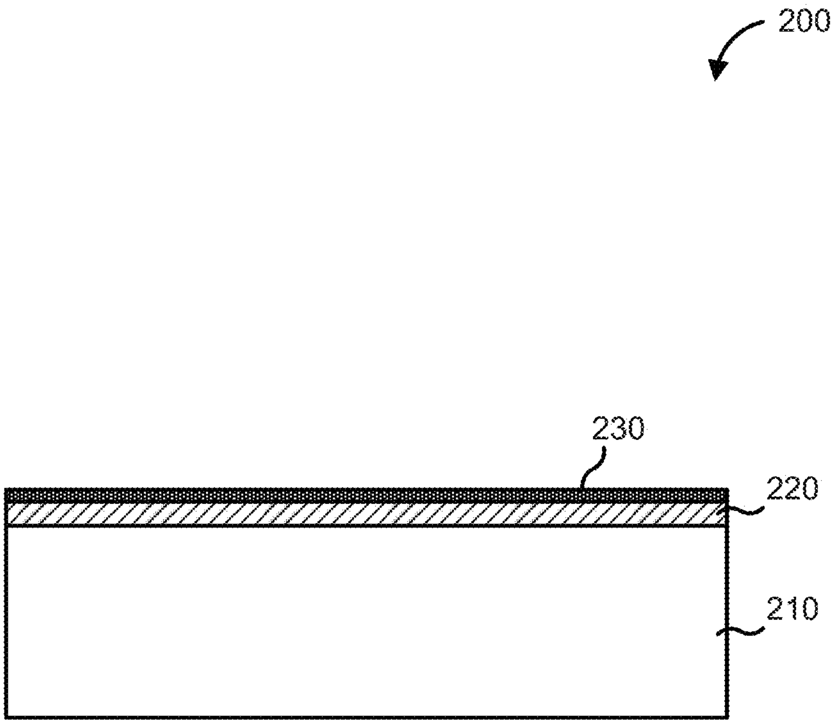
FIG. 2 is a schematic illustration of a field emitter that includes a N-UNCD film, according to an embodiment.

FIG. 2 is a schematic illustration of a planar FEC 200, according to an embodiment. The planar FEC 200 can be formed using the method 100 or any other method described herein. The planar FEC 200 includes a planar substrate 210, a first layer 220, and a N-UNCD film 230.

The planar substrate 210 can be formed from metals such as, for example, stainless steel, molybdenum, niobium, tungsten, gold, platinum, alloys, any other suitable material or a combination thereof. In one embodiment, the planar substrate 210 can include stainless steel. The planar substrate 210 can have any suitable shape or size. For example, the planar substrate 210 can include a cylinder, a disc, a block, etc., and can have any suitable cross-section, for example circular, square, rectangular, oval, polygonal, an asymmetric shape or any other shape.

The first layer 220 is disposed over the planar substrate 210. In some embodiments, the first layer 220 includes a transition metal such as, for example, molybdenum (Mo), titanium (Ti), tungsten (W), tantalum (Ta), niobium (Nb), rhenium (Rh), ruthenium (Ru), any other suitable transition metal or a combination thereof. In one embodiment, the first layer 220 can include Mo, for example, a polycrystalline Mo substrate. The first layer 220 can be disposed on the planar substrate 210 using any suitable method such as sputtering, e-beam deposition, electroplating, any other suitable method or a combination thereof. Furthermore, the first layer 220 can have any suitable thickness, for example about 50 nm to about 10 microns.

The N-UNCD film 230 is disposed over the first layer 220. The first layer 220 can serve as a nucleation layer for disposing the N-UNCD layer 230 thereon. The N-UNCD film 230 is disposed using a microwave plasma deposition process as described with respect to the method 100. The N-UNCD film 230 has a percentage of nitrogen in the range of about 0.05 atom % to about 0.5 atom % (e.g., 0.06 atom %, 0.07 atom %, 0.08 atom %, 0.09 atom %, 0.1 atom %, 0.12 atom %, 0.14 atom %, 0.16 atom %, 0.18 atom %, 0.2 atom %, 0.25 atom %, 0.3 atom %, 0.35 atom %, 0.4 atom %, 0.45 atom % or about 0.5 atom % inclusive of all ranges and values therebetween). Furthermore, the N-UNCD film can have a thickness in the range of about 30 nm to about 1 microns.

Moreover, the planar FEC 200 has about $10^{12}$ to about $10^{14}$ emitting sites per $cm^2$. In some embodiments, a carrier concentration in the N-UNCD film 230 can be about $10^{20}$ per $cm^3$. The N-UNCD film 230 can have a current density in the range of about 0.1 $mAmp/cm^2$ to about 25 $mAmp/cm^2$ (e.g., about 0.1 $mAmp/cm^2$, 0.3 $mAmp/cm^2$, 0.5 $mAmp/cm^2$, 0.7 $mAmp/cm^2$, 0.9 $mAmp/cm^2$, 1 $mAmp/cm^2$, 2 $mAmp/cm^2$, 3 $mAmp/cm^2$, 4 $mAmp/cm^2$, 5 $mAmp/cm^2$, 10 $mAmp/cm^2$, 15 $mAmp/cm^2$, 20 $mAmp/cm^2$, or about 25 $mAmp/cm^2$ inclusive of all ranges and values therebetween) between an electric field gradient of about 45 MV/m to about 65 MV/m. In other embodiments, the current can be higher at a higher electric field or if N-UNCD film 230 is deposited onto a high aspect ratio substrate.

In other embodiments, the N-UNCD film 230 and thereby, the planar FEC 200 can have a beam emittance (i.e., an electron beam emittance) in the range about 0.5 mm×mrad/mm-rms to about 3 mm×mrad/mm-rms (e.g., about 0.5. 1, 1.5, 2, 2.5 or about 3 mm×mrad/mm-rms inclusive of all ranges and values therebetween). In still other embodiments, the N-UNCD film 230 and thereby, the field emitter 200 can have a beam emittance smaller than or equal to 0.5 mm×mrad/mm-rms (e.g., about 0.1, 0.2, 0.3, 0.4 or 0.49 mm×mrad/mm-rms inclusive of all ranges and values therebetween).

In further embodiments, N-UNCD film 230 and therefore the planar FEC 200 has a full width half maximum longitudinal energy spread of about 0.5% to about 1% (e.g. about 0.5%, 0.6%, 0.7%, 0.8%, 0.9% or about 1.0% inclusive of all ranges and values therebetween) at a nominal electron energy of 2 MeV. In other embodiments, the N-UNCD film 230 and thereby the planar FEC 200 has a rms energy spread of about 9% to about 14% at the nominal electron energy of 2 MeV. Moreover, the planar FEC 200 can be operable at pressures of up to about $10^{-5}$-$10^{-6}$ Torr. Furthermore, the planar FEC 200 can be operable by a RF source.

The planar FEC 200 can be used as an electron injector, for example, for electron accelerators, electron linac factories for Mo-99 production for nuclear medicine, hand-held X-ray units, compact bright inverse Compton sources for basic science and semi-conductor lithography, cargo inspection or any other use for electron injection is required.

Figure 3:
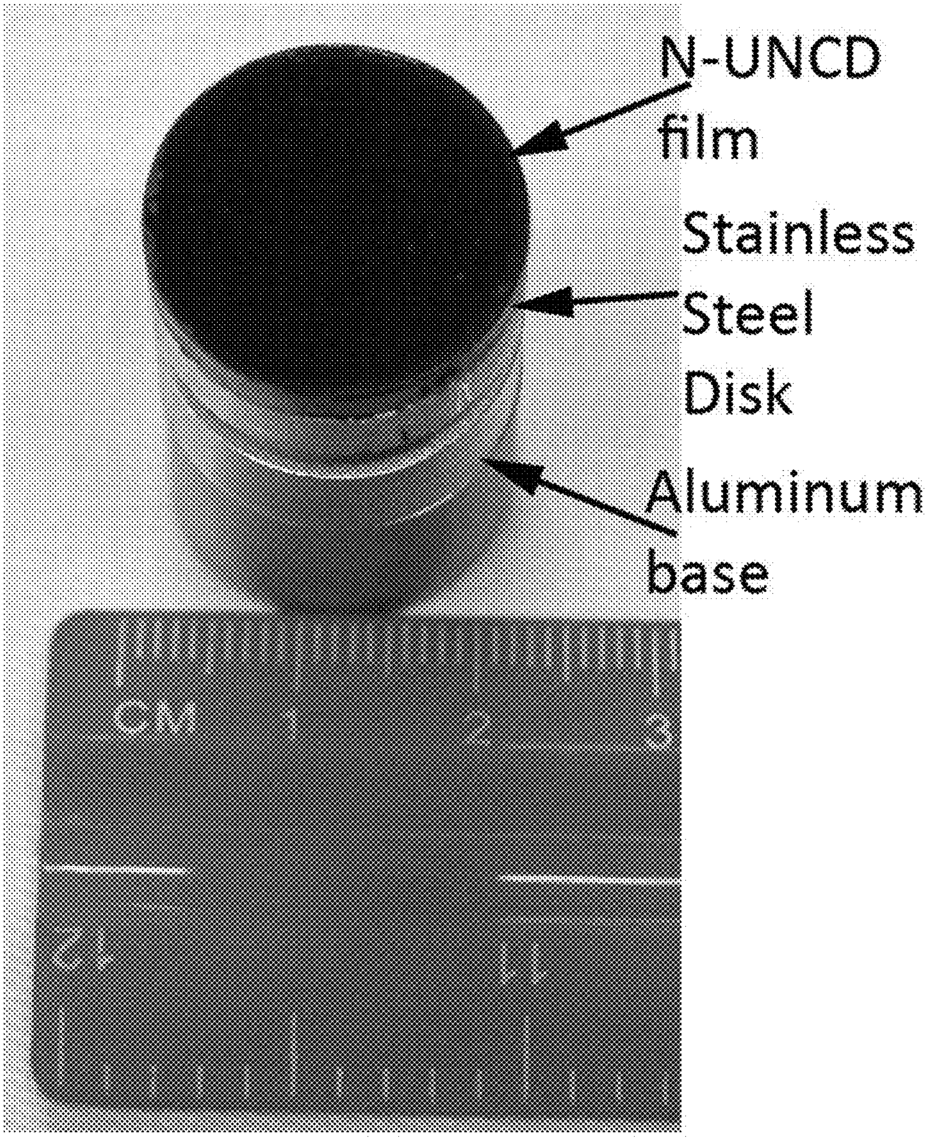
FIG. 3 is a perspective view of a field emitter that includes a N-UNCD film disposed on a stainless steel substrate which is coupled to an aluminum base, according to one embodiment.

FIG. 3 is a perspective view of a FEC plug structured to emit electrons under a suitable RF field. The FEC plug includes a stainless steel disk having a thickness of about 3 mm and a diameter of about 20 mm, with a N-UNCD film disposed over the stainless steel disk. The stainless steel disk is bolted on an aluminum base. The FEC plug is structured to be inserted or otherwise electrically coupled to an RF gun and mimics the shape and dimensions of a conventional FEC plug for the RF gun.

Thus, a conventional FEC plug can easily be replaced with the N-UNCD FEC plug without requiring any modifications to the RF gun. The FEC plug is structured such that electron bunches are generated and phased by the electric RF field every time a positive electric field peaks on the FEC plug's surface, and high repetition rates equal to the RF frequency are supported automatically.

The substrate was formed using a particular embodiment of the method 200. A buffer Mo layer (i.e., the first layer) was deposited on the stainless steel disk using a custom magnetron sputtering system with a base pressure of $10^{-7}$ Torr. The Mo layer had a thickness of about 100-200 nm. A slurry of ND particles was used as a seeding layer on the Mo layer. The average particle size of the ND particles was about 5-10 nm. Mo substrates were immersed into the ND slurry and subjected to ultrasonic treatment in the solution for about 20 min.

A N-UNCD film was grown on the Mo layer using a microwave plasma source having a frequency of about 915 MHz. The substrate temperature was about 850 degrees Celsius. The stainless steel substrate was subjected to a mixture of gases including 3 sccm methane, 160 sccm argon and 40 sccm nitrogen. The substrate was maintained at a pressure of about 56 Torr and microwave power of about 2.3 kW in a MPCVD chamber to produce the microwave plasma which grows the N-UNCD film on the substrate. The N-UNCD film has in the range of about $10^{12}$ emitting grain boundaries per $cm^2$ to about $10^{14}$ emitting grain boundaries per $cm^2$ (e.g., about $10^{13}$ emitting grain boundaries per $cm^2$). This is substantially greater relative to a conventional Spindt field emitter which has about $10^8$ emitting tips per $cm^2$.

Figure 4:
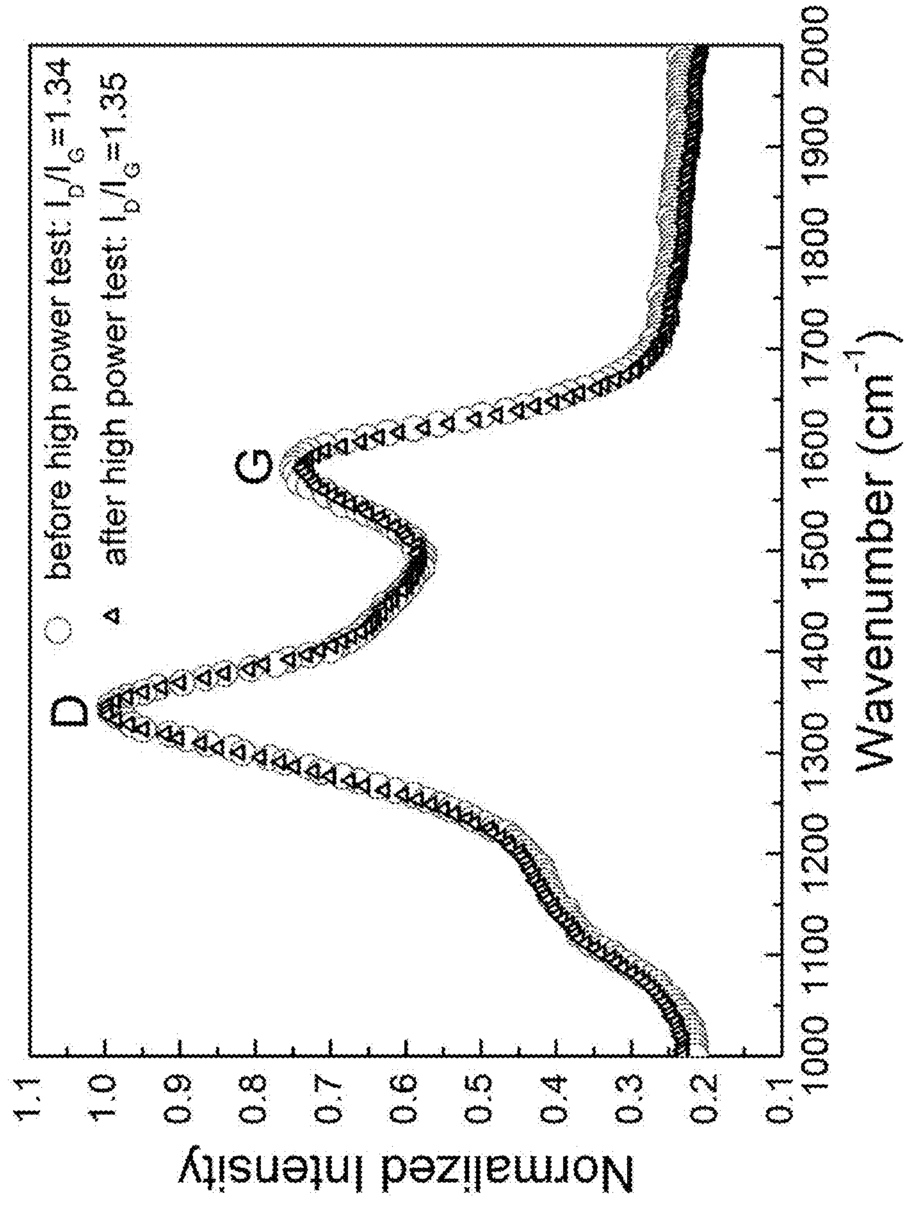
FIG. 4 is a plot of visible Raman spectra of the N-UNCD film included in the field emitter of FIG. 3 before and after high power testing.

FIG. 4 is a plot of a visible Raman spectrum recorded by a Renishaw InVia Raman Microscope using a He—Ne laser (wavelength ($\lambda$)=633 nm). The shoulder around wavenumber ($\upsilon$) 1140 $cm^{-1}$ corresponds to a wavenumber ($\upsilon$) (C-H in-plane bending) vibrational mode of transpolyacetylene and the broad peaks at wavenumber ($\upsilon$) 1340 $cm^{-1}$ and 1540 $cm^{-1}$ correspond to the D and G bands of diamond, respectively. An expected resulting carrier concentration in the N-UNCD about $10^{20}$ per $cm^3$. In FIG. 4, the Raman spectra before and after high power tests with more than a billion RF burst are compared. No significant difference between the N-UNCD film is observed before and after high power tests confirming the high resistance of the N-UNCD film to external hard high power conditions.

Figure 5:
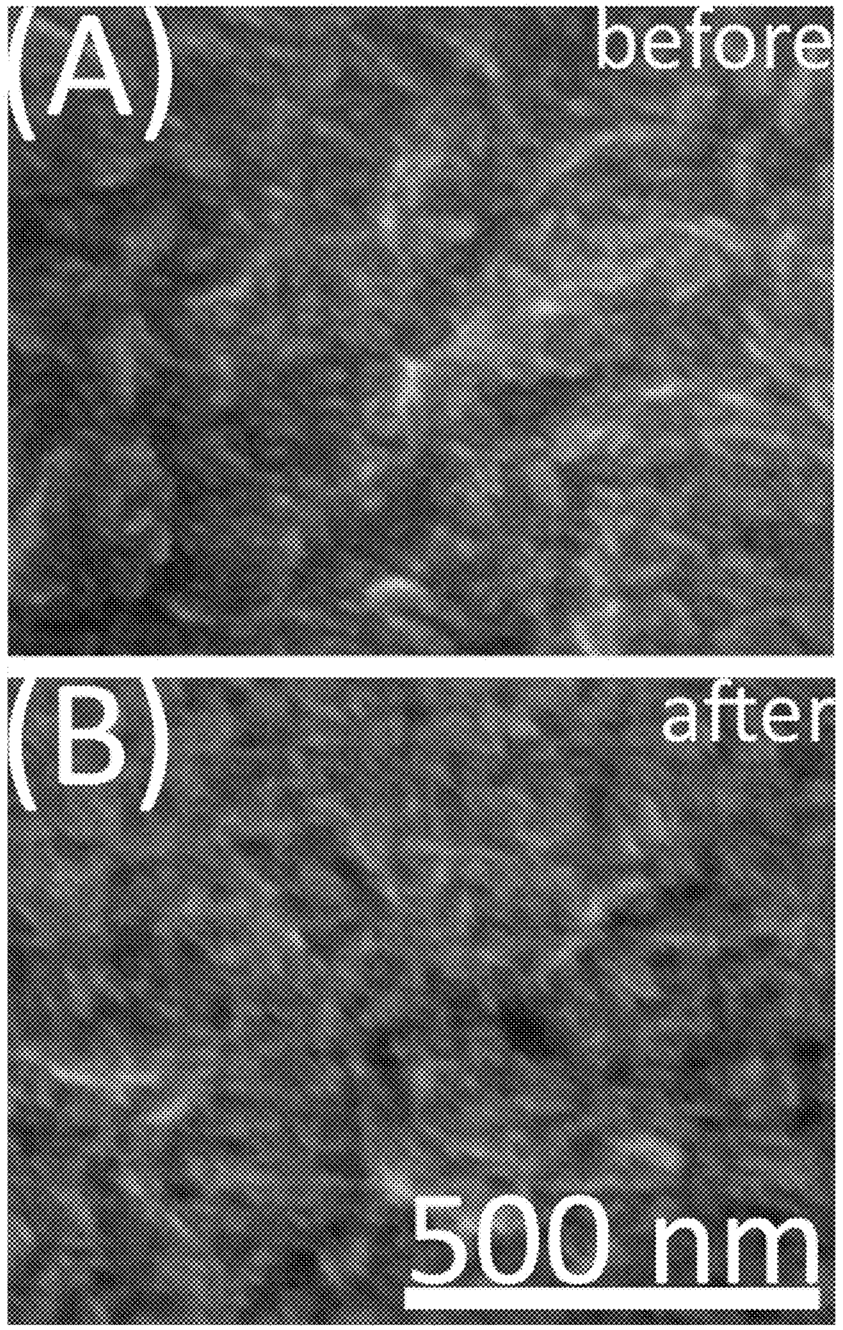
FIG. 5 panel A is an SEM image of the N-UNCD film of FIG. 3 before high power testing, and FIG. 5 panel B is an SEM image of the N-UNCD film of FIG. 3 after high power testing.

FIGS. 5A and 5B show SEM images of the N-UNCD film before and after high power testing. A typical uniform needle-like nanostructure, typical for N-UNCD, was observed before and after high power testing further confirming the stability of the N-UNCD film.

Figure 6:
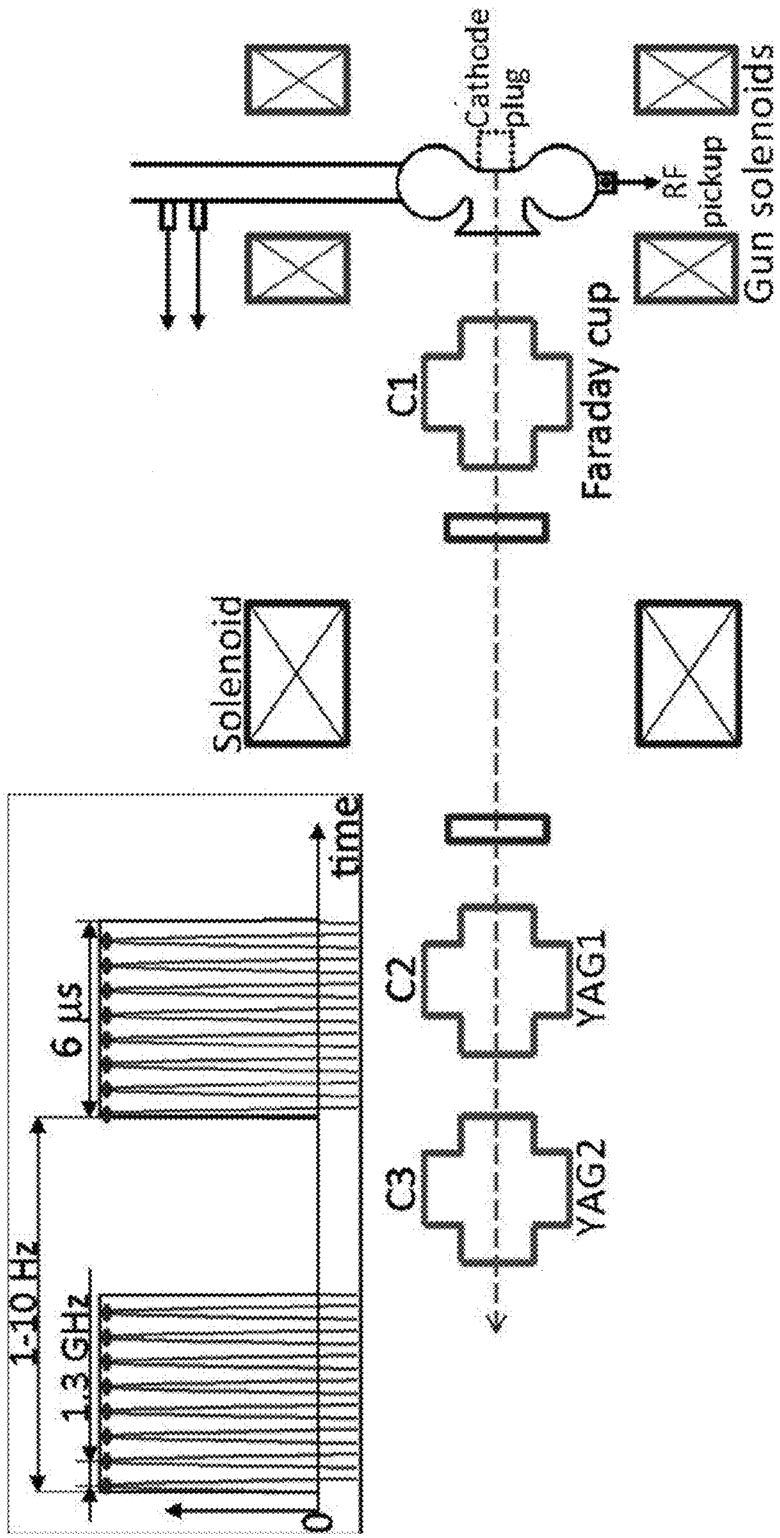
FIG. 6 is a schematic illustration of an experimental setup for measuring field emission properties of the N-UNCD film included in the field emitter of FIG. 3.

Field emission performance of the N-UNCD planar FEC was tested in a dedicated test stand shown in FIG. 6. The RF electron injector was a half-cell standing wave copper cavity with a designed peak field of 1 to 120 MV/m on the cathode surface, depending on the input RF power. The frequency of the cavity was tuned to 1.3 GHz to match a klystron frequency. The FEC plug is disposed on a retractable actuator and can be replaced via detaching a flange on the RF injector's back wall. The injector cavity with the N-UNCD FEC plug was evacuated to a base pressure of about $10^{-9}$ Torr. The principal timing scheme is shown in the inset shown in FIG. 6. Quasi-rectangular RF pulses 6 microseconds long contained about 8,000 oscillations of the 1.3 GHz RF frequency. RF pulses were separated in time by intervals corresponding to klystron's repetition rate. When conditioning the cavity to high power, the klystron was run at a 10 Hz repetition rate. A repetition rate of 1 Hz was used for measurements.

A Faraday cup (FC) assessed the current/charge produced by an RF pulse. Thus, the peak charge can be estimated by dividing the total charge in the RF pulse by the number of GHz oscillations in the RF pulse. An imaging system consisting of a solenoid, steering (trim) magnets, and YAG screens located downstream of the injector was used to project and manipulate the beam emitted from the N-UNCD FEC.

The injector cavity was conditioned to sustain an RF power of 1.77 MW. Conditioning took about 15 hours at 10 Hz. This corresponded to about $10^6$ RF pulses and about $10^9$ electron bunches. Breakdown events were monitored by an X-ray photomultiplier tube, a mirror in the Cl chamber capturing visible-light flashes, and an RF pickup probe measuring transmitted/reflected RF power in the cavity. There were only 3 breakdowns detected on the N-UNCD surface over the course of conditioning, while there were 100's of breakdowns on the cathode host bore edge.

Figure 7:
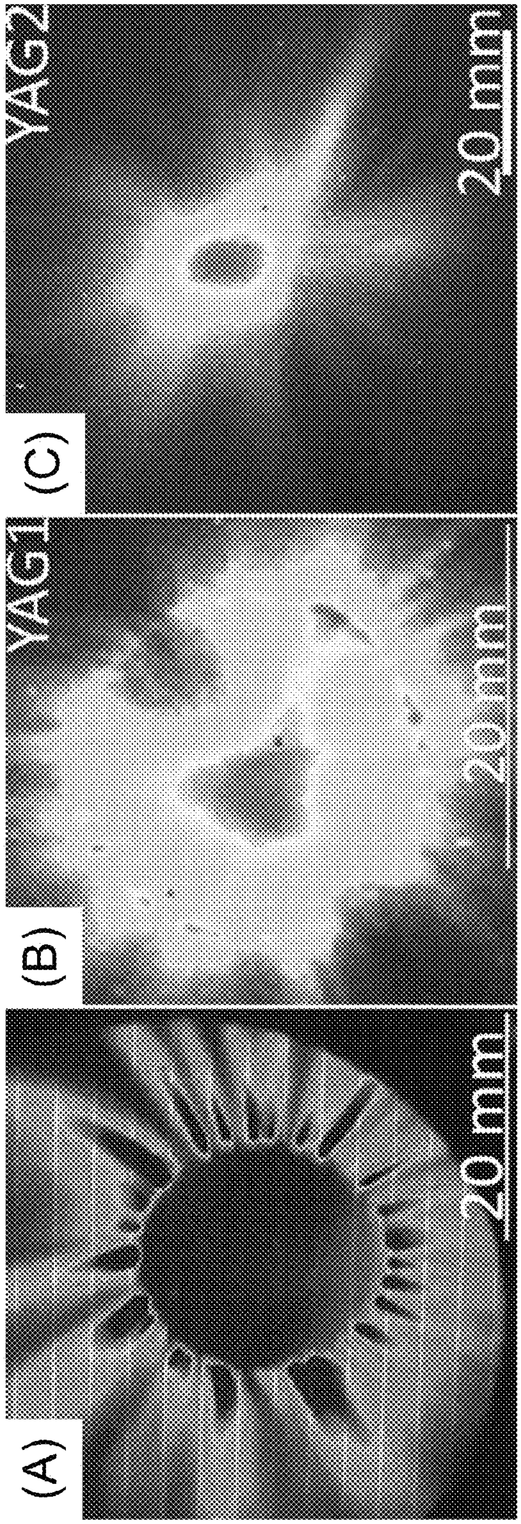
FIG. 7 panel A is an image of electron emission of a planar copper cathode on an yttrium aluminum garnet screen in the closest vicinity to the field emitter (abbreviated as YAG1)

FIG. 7 panel A is a YAG1 image of electron emission from a planar copper cathode about 3 mm away from its flush position. The copper cathode surface is the dark circle which is surrounded by bright streaks. The streaks are wide-phase-spread dark current emissions from the cathode bore edges. FIG. 7 panel B is a YAG 1 image of electron emission from the planar N-UNCD FEC of FIG. 3 which is 3 mm away from its flush position (i.e., flush with an inner back wall of the cavity). FIG. 7 panel C shows the same electron emission as shown in panel B but this time projected on a downstream YAG2 screen.

The significant difference here is that unlike a planar copper surface (no emission in FIG. 7 panel A) the N-UNCD film of the FEC of FIG. 3 produces an intense emission current comparable with that from the cathode bore edges (see FIG. 7 panel B and panel C). To quantify the observed field emission from the N-UNCD surface, a planar non-emitting copper cathode is used as a reference. The cavity frequency was tuned such that the cavity resonated at 1.3 GHz with the copper cathode retracted 3 mm away from its zero position (i.e., flush with an inner back wall of the cavity). For the same reason, the N-UNCD FEC was placed in the identical position. Here, 1.77 MW input power corresponded to electric fields of 65.5 MV/m and 212 MV/m on the cathode's surface and the cathode bore edge ring, respectively.

Figure 8:
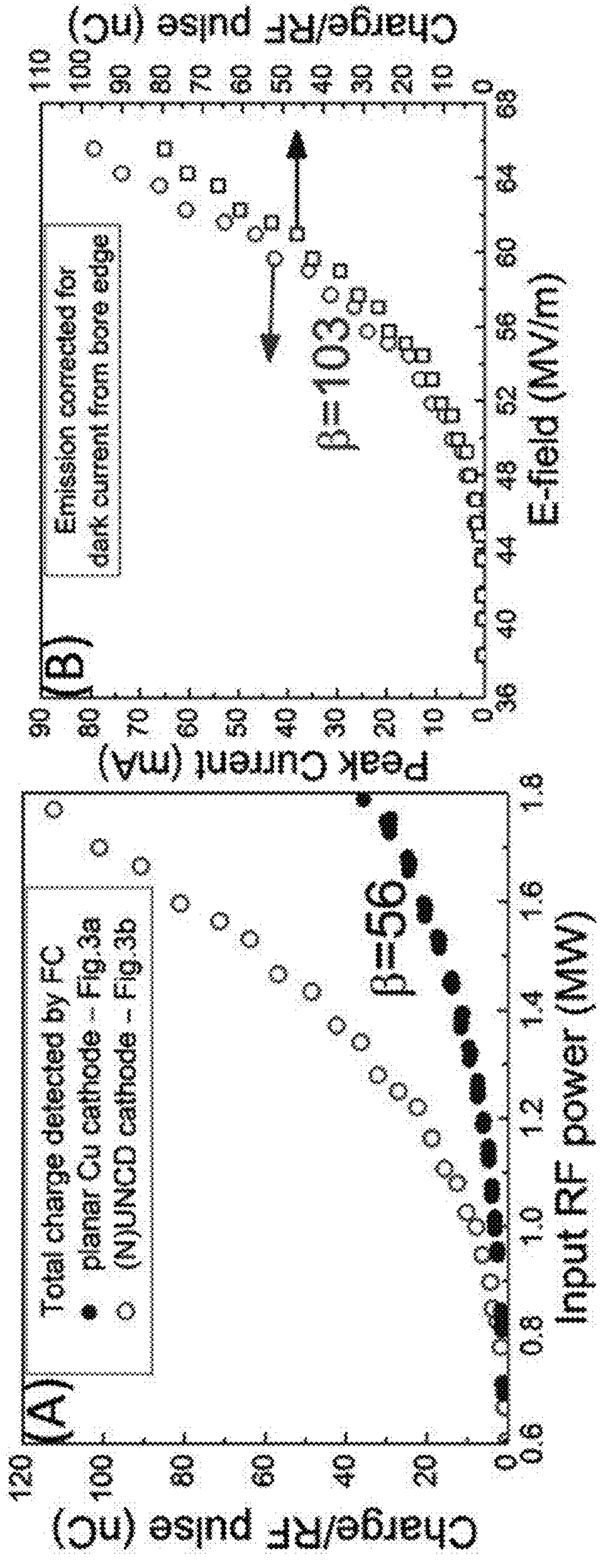
FIG. 8 panel A is a plot of total charge per radio frequency (RF) pulse recorded by a Faraday cup versus input RF power: dark solid circles are data from the host copper bore edge FIG. 7 panel A; white open circles are data from the N-UNCD field emitter.

For a correct direct comparison, the total charge collected by the Faraday cup versus RF power is plotted in FIG. 8 panel A for both the copper cathode and the N-UNCD FEC. It is assumed that: (1) the field enhancement factor and emitter area of the copper edge is the same in both cases; and (2) the planar copper cathode case (FIG. 7 panel A) represented by solid circles in FIG. 8 panel A had only one electron emission component originating from the bore edge ring. Finally, using the data plotted in FIG. 8 panel A, the parasitic bore ring dark current charge was subtracted from the total charge recorded by the Faraday cup for the N-UNCD FEC. The corrected N-UNCD field emission data is plotted in FIG. 8 panel B. The results are also plotted in terms of peak current $I_{peak}$ (current per single GHz oscillation) versus electric field gradient.

The 6 µs RF pulse contains $N_{GHz}=8\times10^3$ GHz oscillations at f=1.3 GHz. It is assumed that emission takes place within 60 degrees of phase for every GHz oscillation (±30 degrees around the RF electric field maximum, i.e., ⅙ time length of the positive part of the GHz oscillation). Then peak current is calculated as:

$$I_{peak} = \frac{Q_{GHz}}{\frac{1}{6} \times 1/f} I,$$

where $$Q_{GHz} = \frac{Q_{RFpulse}}{N_{GHz}}$$

with $Q_{GHz}$ and $Q_{RF}$ pulse being the charge per GHz oscillation and RF pulse, respectively. In FIG. 8 panel A and panel B, the posted Fowler-Nordheim (F-N) factors β (also referred to herein as "the field enhancement factor"), were extracted via linear approximation of the charge-electric field (Q-E) curves plotted in F-N coordinates, i.e.;

$$\log\left(\frac{Q}{E^{5/2}}\right) \text{ versus } 1/E$$

The electric field power 5/2 (which traditionally is 2 in direct current case) comes from a fact that the field emission needs to be time averaged in the RF case.

The maximum power of 1.77 MW of the RF source corresponded to maximum local electric field $E_{max}^{loc}$ of 6.8 GV/m on the N-UNCD FEC surface with β=103 and 11.8 GV/m on the copper bore edge ring with β=56. This indicates that the achieved maximum power over the course of conditioning was not limited by the N-UNCD FEC, but by the copper bore ring. This is further supported by the observation of 100's of breakdowns on the ring with only 3 occurring on the N-UNCD FEC. This suggests that with the measured β=103, the N-UNCD FEC, if not limited by the copper bore edge ring, can be pushed to up to 96 MV/m with a peak current as high as 1 A. This further suggests that maximum gradient of 66 MV/m achieved corresponds to an operating point (peak current more than 10 times smaller than the projected 1 A at 96 MV/m) where the N-UNCD FEC should perform stably.

The stability of the electron emission from the N-UNCD FEC was tested. With the Faraday cup, two current-voltage (I-E) curves (as in FIG. 8 panel B) were measured over a one hour period with the system running at 10 Hz repetition rate to improve statistics. One hour corresponded to $36\times10^3$ RF pulses and $288\times10^6$ GHz oscillations. Results are compiled in Table I. No significant deviation was observed.

TABLE I

Stability Test Results of N-UNCD FEC

| Time(s)/RF pulses/GHz oscillations | Peak Current (mA) at 45 MV/m | Peak Current (mA) at 55 MV/m | Peak Current (mA) at 65 MV/m |
|---|---|---|---|
| 0s/0/0 | 1.56 ± 0.08 | 19.54 ± 0.98 | 79.37 ± 3.97 |
| 3,600s/36 × $10^3$/288 × $10^6$ | 1.47 ± 0.07 | 19.24 ± 0.96 | 79.26 ± 3.96 |

The longitudinal energy spread of the emitted electrons were determined semi-empirically. Using SUPERFISH simulations, the energy of an electron at the exit of the injector was calculated as a function of the phase of the GHz oscillation. SUPERFISH is a field solver program which calculates the eigen values and solutions of RF cavities in either 2-D coordinates or axially symmetric cylindrical co-ordinates. The experimentally determined maximum local electric field $E_{max}^{loc}=\beta\times E_{gradient}$ of 6.8 GV/m was directly inserted into the Fowler-Nordheim equation:

$$I_f = 5.7\cdot10^{-12}\cdot10^{4.52\cdot\varphi^{-0.5}}\cdot A_e(\beta E)^{2.5}\varphi^{1.75}\exp\left(\frac{-6.53\cdot10^9\varphi^{1.5}}{\beta E}\right)$$

where, $I_f$ is Fowler-Nordheim current, $A_e$ is effective emitter area ($m^2$), β is the field enhancement factor, E is amplitude of the macroscopic field applied to the surface (V/m), and ϕ is the work function (eV).

Figure 9:
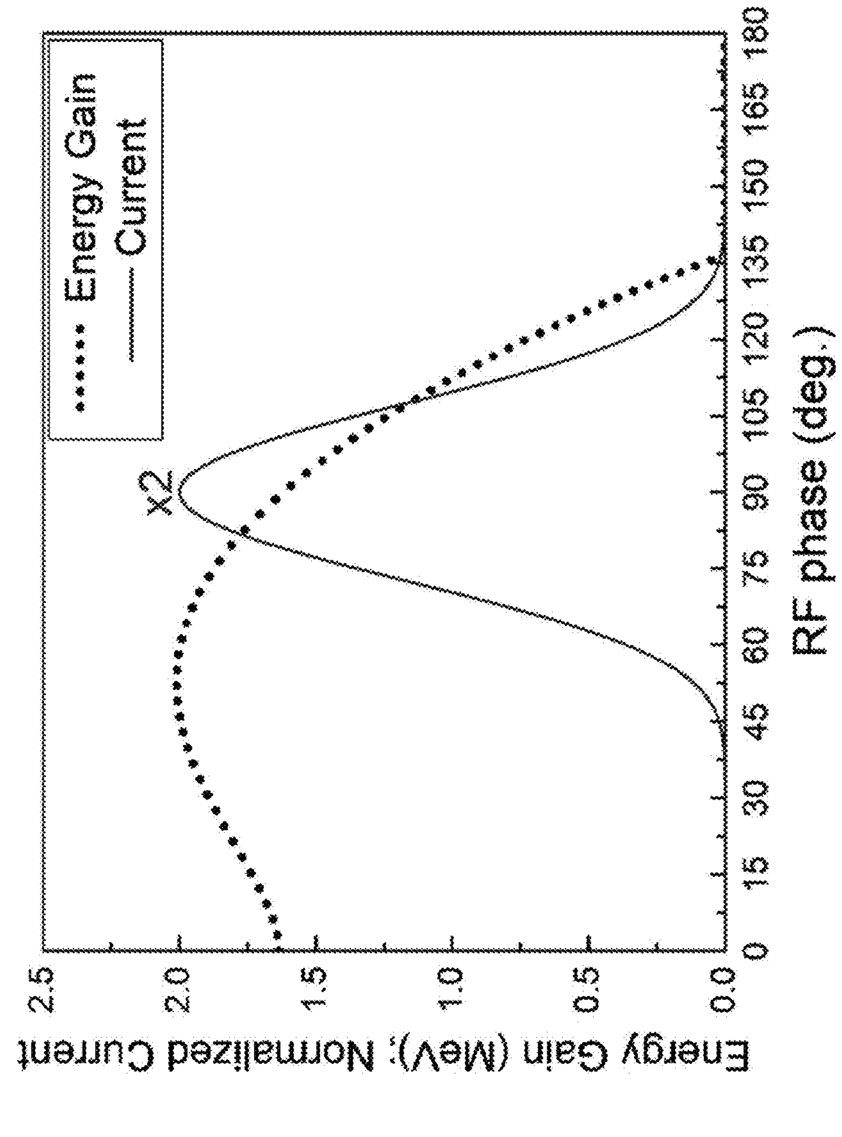
FIG. 9 is a plot of phase dependence of an energy gain of an electron in a cavity superimposed on the current directly calculated from Fowler-Nordheim equation with the experimentally measured maximum surface electric field $\beta\times E_{gradient}=6.8$ GV/m, where β is the Fowler-Nordheim field enhancement factor and $E_{gradient}$ is the surface electric RF field.
Figure 10:
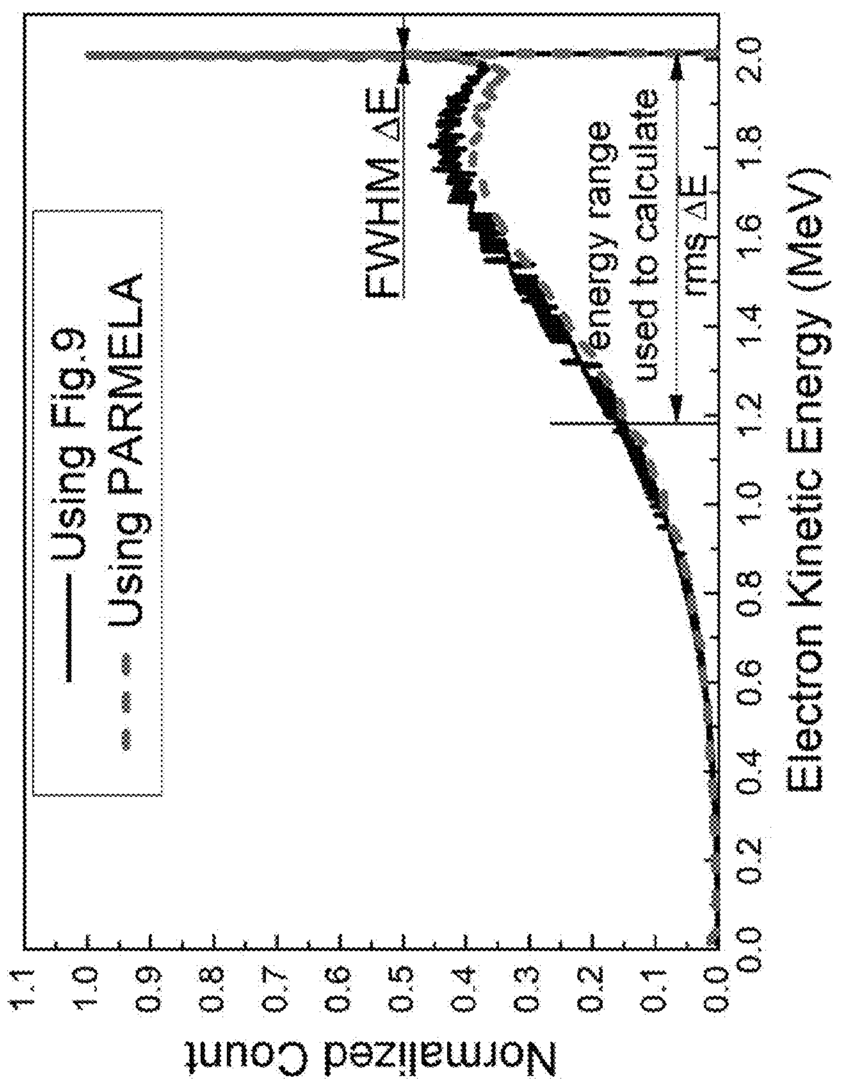
FIG. 10 is an electron energy spectrum computed semi-empirically using the results of FIG. 9 and the electron tracking code PARMELA.

In this manner, the current versus the phase of the GHz oscillation was determined and is shown in FIG. 9. Energy and current dependences on the phase superimposed in FIG. 9 resulted in the electron energy spectrum calculated using PARMELA, which is shown in FIG. 10. PARMELA is a particle tracking code and is an abbreviation for "Phase and Radial Motion in Ion Linear Accelerators". PARMELA is a multi-particle code that generates the linac and transforms the electron beam, represented by a collection of particles, through a user-specified linac and/or transport system.

The full width half maximum (FWHM) longitudinal energy spread was deduced as 14 keV and the rms longitudinal energy spread (with 85% electrons counted) was 220 keV. This energy spread was indirectly confirmed by imaging the electron beam on YAG1 while scanning with steering magnets. The beam moved as a whole, preserving its shape. The obtained energy spread is case-specific, and can be improved simply by cavity design. For example, a FEC can be made two-sectional with a varied cathode cell length. Optimization of this parameter can lead to the rms energy spread as low as 1%. This means that the electron energy spectrum will shape into a narrow single peak curve because of the best overlapping between the phase dependences of energy and current.

As the energy spread is narrow, the two beam projections presented in FIG. 7 panel B and panel C can be used to deduce the emittance of the generated electron beam by the photocathode Formula;

$$\varepsilon = \frac{\sigma_{waist}}{L} \times \sqrt{\sigma_L^2 - \sigma_{waist}^2}$$

where $\sigma_{waist}$ is the radius of the beam waist and $\sigma_L$ is the beam radius projected on a second screen placed at a distance L. The sign a refers to the standard deviation measure of Gaussian beams. From the YAG1 images (FIG. 7 panels B and panel C), $\sigma_{waist}$ and $\sigma_L$ were measured as 1.87 mm and 4.20 mm, respectively, being averaged over orthogonal x and y directions. Given the distance L=465 mm and the N-UNCD FEC radius=10 mm, the beam emittance value was 15 mm×mrad, or equivalently 1.5 mm×mrad/mm-rms when normalized to the emitting area radius.

Thus the N-UNCD FEC can serve as high efficiency and stable field emitters for high and low grade accelerator applications. The N-UNCD FEC can be planar, as described herein, or can have any other shape. The N-UNCD FECs can be assembled as a diode or triode, or operated in a single electrode configuration directly subject to a strong electric field on its surface.

Figure 11:
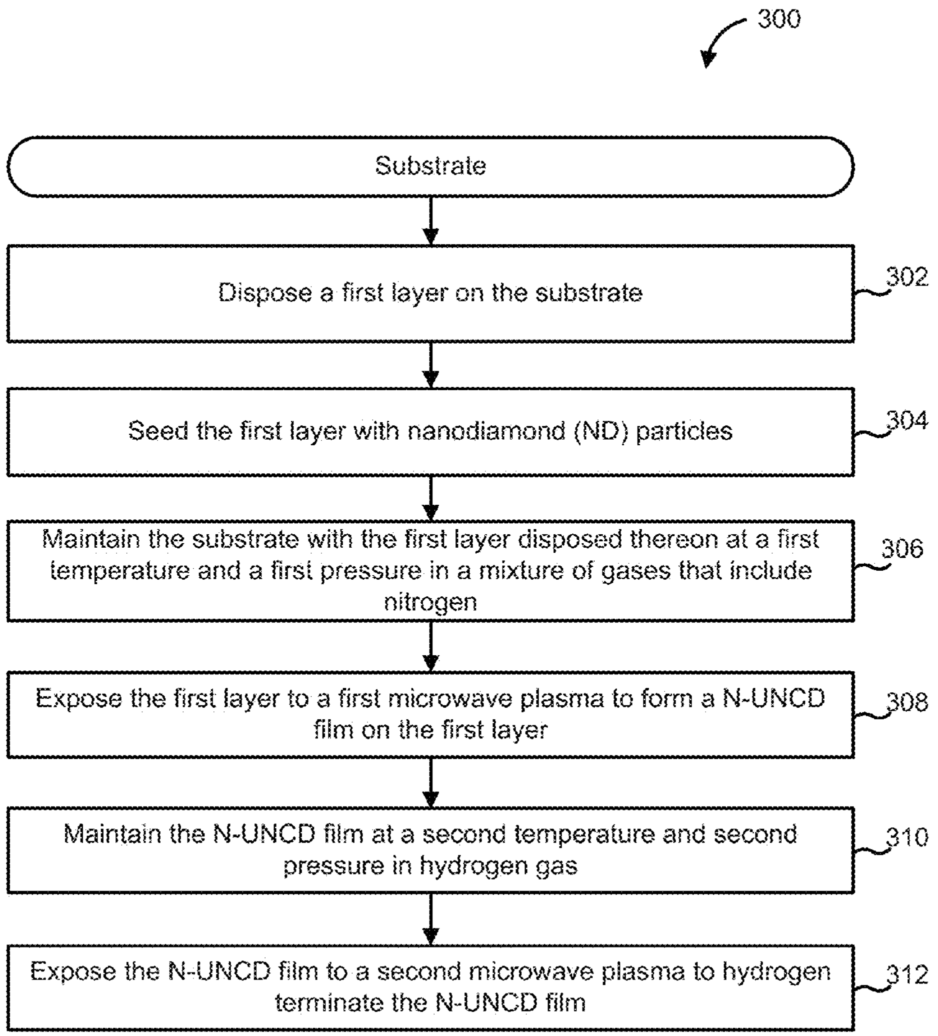
FIG. 11 is a schematic flow diagram of a method of forming a photocathode, according to an embodiment.

In some embodiments, a N-UNCD film can be terminated with hydrogen and used as a photocathode which is highly stable and can be operated under moderate vacuum, for example at pressures of up to about $10^{-5}$ Torr. FIG. 11 is schematic flow diagram of an exemplary method 300 for forming a photocathode that includes a hydrogen terminated N-UNCD film (N-UNCD:H). The method 300 includes disposing a first layer on a substrate, at 302. The substrate can include metals such as, for example, stainless steel, molybdenum, tungsten, niobium, gold, platinum, alloys, any other suitable material or a combination thereof. In one embodiment, the substrate can include stainless steel. Use of the stainless steel substrate can yield a stable photocathode which can be mass produced, and is relatively cheap. The substrate can have any suitable shape or size. For example, the substrate can include a cylinder, a disc, a block, etc., and can have any suitable cross-section, for example circular, square, rectangular, oval, polygonal, an asymmetric shape or any other shape. In particular embodiments, the substrate is planar. In such embodiment, the photocathode is planar.

In some embodiment, the first layer includes a transition metal such as, for example, molybdenum (Mo), titanium (Ti), tungsten (W), tantalum (Ta), niobium (Nb), rhenium (Rh), ruthenium (Ru), any other suitable transition metal or a combination thereof. In one embodiment, the first layer can include Mo, for example, a polycrystalline Mo substrate. The first layer can be disposed on the substrate using any suitable method such as sputtering, e-beam deposition, electroplating, any other suitable method or a combination thereof. Furthermore, the first layer can have any suitable thickness, for example about 50 nm to about 10 microns.

The first layer is seeded with nanodiamond (ND) particles, at 304. The ND particles can be in the form of a slurry and have a size in the range of about 1 nm to about 20 nm (e.g., about 1 nm, 2 nm, 4 nm, 6 nm, 8 nm, 10 nm, 12 nm, 14 nm, 16 nm, 18 nm or about 20 nm inclusive of all ranges or values therebetween) although larger sized ND particles can also be used (e.g., up to about 100 nm). In one embodiment, seeding is performed by immersing the substrate with the first layer disposed thereon in a slurry of the ND particles and sonication (e.g., in an ultrasonic bath) for a predetermined period of time. The ND particles promote rapid nucleation and growth of an N-UNCD film on first layer over the substrate.

The substrate with the seeded first layer disposed thereon is maintained at a first temperature and a first pressure in a mixture of gases that include nitrogen, at 306. In some embodiments, the pre-seeded substrate with the first layer disposed thereon can be disposed in an MPCVD chamber. The substrate is heated to the first temperature which can be in the range of about 650 degrees Celsius to about 950 degrees Celsius (e.g., 650 degrees Celsius, 700 degrees Celsius, 75 degrees Celsius, 800 degrees Celsius, 850 degrees Celsius, 900 degrees Celsius or about 950 degrees Celsius inclusive of all ranges and values therebetween). Furthermore, the first pressure can be in the range of about 40 Torr to about 70 Torr (e.g., about 40 Torr, 45 Torr, 50 Torr, 55 Torr, 60 Torr, 65 Torr or about 70 Torr inclusive of all ranges and values therebetween).

As described before the mixture of gases includes nitrogen. In one embodiments, the mixture of gases includes methane, argon and nitrogen. In some embodiments, amount of nitrogen in the mixture can be in a range of about 5 vol % to about 20 vol %.

The first layer is exposed to a first microwave plasma to form a N-UNCD film on the first layer, at 308. In some embodiments, the microwave plasma can be produced using a microwave plasma source (e.g., having a frequency of about 915 MHz). Any suitable power can be applied on the plasma source to produce the first microwave plasma, for example a power in the range of about 2 kW to about 3 kW (e.g., 2 kW, 2.2 kW, 2.4 kW, 2.6 kW, 2.8 kW or about 3 kW inclusive of all ranges and values therebetween).

The N-UNCD film has a percentage of nitrogen in the N-UNCD film in the range of about 0.05 atom % to about 0.5 atom % (e.g., 0.06 atom %, 0.07 atom %, 0.08 atom %, 0.09 atom %, 0.1 atom %, 0.12 atom %, 0.14 atom %, 0.16 atom %, 0.18 atom %, 0.2 atom %, 0.25 atom %, 0.3 atom %, 0.35 atom %, 0.4 atom %, 0.45 atom % or about 0.5 atom % inclusive of all ranges and values therebetween). In some embodiments, a carrier concentration in the N-UNCD film can be about $10^{20}$ per $cm^3$.

The N-UNCD film disposed on the substrate is maintained at a second temperature and a second pressure in hydrogen gas, at 310. The second temperature can be in the range of about 600 degrees Celsius to about 900 degrees Celsius (e.g., about 600 degrees Celsius, 650 degrees Celsius, 700 degrees Celsius, 750 degrees Celsius, 800 degrees Celsius, 850 degrees Celsius, or about 900 degrees Celsius inclusive of all ranges and values therebetween). The second pressure can be in the range of about 10-20 Torr (e.g., about 10 Torr, 12 Torr, 14 Torr, 16 Torr, 18 Torr, or about 20 Torr inclusive of all ranges and values therebetween). The hydrogen gas can be provided at a flow rate of about 100-300 sccm (e.g., about 100 sccm, 150 sccm, 200 sccm, 250 sccm, or about 300 sccm inclusive of all ranges and values therebetween). In other embodiments, the mixture of gases can include a source of deuterium such that the N-UNCD film is terminated with deuterium instead of hydrogen.

The N-UNCD film is then exposed to a second microwave plasma to hydrogen terminate the N-UNCD film, at 312. The second microwave plasma can be produced (e.g., using the same 915 MHz plasma source as described before) using a microwave power in the range of about 1 kW to about 5 kW (e.g., about 1 kW, 2 kW 3 kW, 4 kW, or about 5 kW inclusive of all ranges and values therebetween). In this manner, a photocathode that includes a N-UNCD:H film disposed over the substrate (e.g., a stainless steel substrate) is formed. In some embodiments, a carrier concentration in the N-UNCD:H film can be about $10^{20}$ per $cm^3$. In some embodiments in which the mixture of gases includes deuterium instead of hydrogen, exposing the N-UNCD film to the microwave plasma terminates the N-UNCD with deuterium.

In one embodiment, the N-UNCD:H film and thereby, the photocathode formed using the method 300 has a quantum efficiency in the range of at least $5\times10^{-8}$ electrons/photon (e.g., about $5\times10^{-8}$ electrons/photon to about $5\times10^{-9}$ electrons/photon or even higher) between a visible wavelength of about 405 nm to about 436 nm. In other embodiments, the N-UNCD:H film and thereby, the photocathode formed using the method 300 has a quantum efficiency of at least $10^{-3}$ electrons/photon at wavelengths in range of about 240 nm to about 270 nm. Thus, the photocathode formed using the method 300 is responsive to ultraviolet (UV) as well as visible wavelengths.

In still other embodiments the N-UNCD:H film and thereby, the photocathode formed using the method 300 has a work function in the range of about 2.9 eV to about 3.2 eV inclusive of all ranges and values therebetween.

In some embodiments, the method 300 can also include operating the photocathode until a performance of the photocathode is depleted. For example, the hydrogen termination of the N-UNCD:H films can degrade over a period of usage. In such embodiments, the photocathode can be exposed to a hydrogen plasma to restore the performance of the photocathode.

Figure 12:
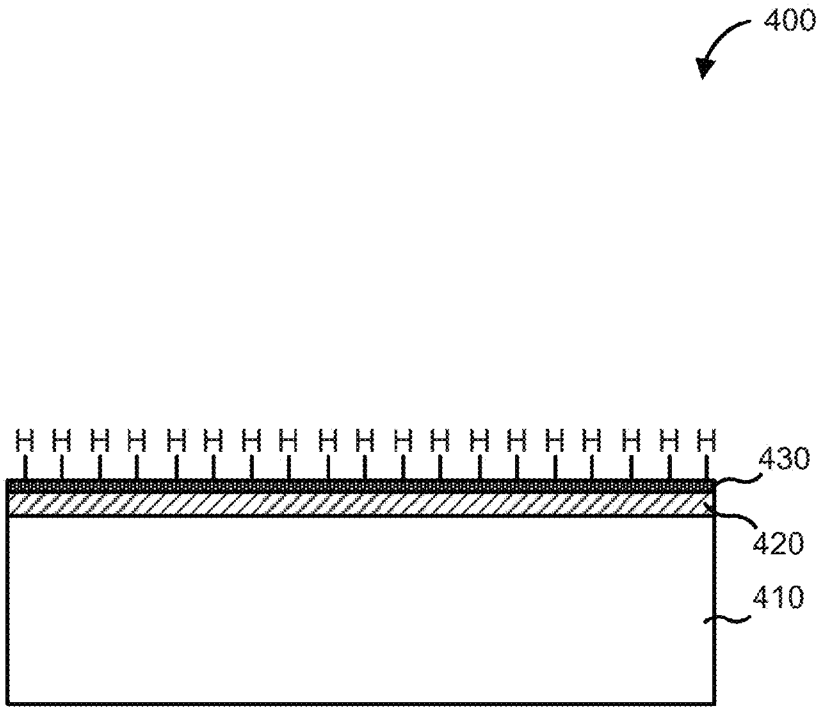
FIG. 12 is a schematic illustration of a photocathode that includes a N-UNCD:H film, according to an embodiment.

FIG. 12 is a schematic illustration of a photocathode 400, according to an embodiment. The photocathode 400 can be formed using the method 300 or any other method described herein. The photocathode 400 includes a planar substrate 410, a first layer 420, and a N-UNCD:H film 430.

The planar substrate 410 can be formed from metals such as, for example, stainless steel, molybdenum, tungsten, gold, platinum, niobium, alloys, any other suitable material or a combination thereof. In one embodiment, the planar substrate 410 can include stainless steel. The planar substrate 410 can have any suitable shape or size. For example, the planar substrate 410 can include a cylinder, a disc, a block, etc., and can have any suitable cross-section, for example circular, square, rectangular, oval, polygonal, an asymmetric shape or any other shape.

The first layer 420 is disposed over the planar substrate 210. In some embodiments, the first layer 220 includes a transition metal such as, for example, molybdenum (Mo), titanium (Ti), tungsten (W), tantalum (Ta), niobium (Nb), rhenium (Rh), ruthenium (Ru), any other suitable transition metal or a combination thereof. In one embodiment, the first layer 420 can include Mo, for example, a polycrystalline Mo substrate. The first layer 420 can be disposed on the planar substrate 410 using any suitable method such as sputtering, e-beam deposition, electroplating, any other suitable method or a combination thereof. Furthermore, the first layer 420 can have any suitable thickness, for example about 50 nm to about 10 microns.

The N-UNCD:H film 430 is disposed over the first layer 420. The first layer 420 can serve as a nucleation layer for disposing an N-UNCD film 430 thereon, which is then terminated with hydrogen to form the N-UNCD:H film as described with respect to method 300. The N-UNCD:H film 230 has a percentage of nitrogen in the range of about 0.05 atom % to about 0.5 atom % (e.g., 0.06 atom %, 0.07 atom %, 0.08 atom %, 0.09 atom %, 0.1 atom %, 0.12 atom %, 0.14 atom %, 0.16 atom %, 0.18 atom %, 0.2 atom %, 0.25 atom %, 0.3 atom %, 0.35 atom %, 0.4 atom %, 0.45 atom % or about 0.5 atom % inclusive of all ranges and values therebetween). In other embodiments, the N-UNCD films can be terminated with deuterium.

The N-UNCD:H film 430 can have any suitable thickness, for example in the range of about 30 nm to about 300 nm (e.g., 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 250 nm or about 300 nm inclusive of all ranges and values therebetween). In some embodiments, a carrier concentration in the N-UNCD:H film 430 is about $10^{20}$ per $cm^3$.

In one embodiment, the N-UNCD:H film 430 has a quantum efficiency in the range of at least $5\times10^{-8}$ electrons/photon (e.g., about $5\times10^{-8}$ to about $5\times10^{-9}$ electrons/photon or even higher), between a visible wavelength of about 405 nm to about 436 nm. In other embodiments, the N-UNCD:H film 430 has a quantum efficiency of at least $10^{-3}$ electrons/photon at wavelengths in range of about 240 nm to about 270 nm. In still other embodiments the N-UNCD:H film 430 has a work function in the range of about 2.9 eV to about 3.2 eV inclusive of all ranges and values therebetween.

The photocathode 400 is robust, has high stability and has high efficiency. The photocathode 400 is operable at moderate vacuum conditions up to a pressure of about $10^{-5}$ Torr. The photocathode 400 can be used in numerous applications such as, for example, as an electron injector in synchrotrons, free electron lasers, linacs, and ultrafast electron systems for imaging and diffraction. Furthermore, the photocathode 400 is operational in the near UV range (i.e., 250 nm to 270 nm) as well as in the visible range (i.e., 405 nm to 436 nm).

In some embodiments, a quantum efficiency of the N-UNCD:H film 430 included in the photocathode 400 can be rejuvenated in situ in an electron injector if it is degraded. For example, an electron injector can be filled with hydrogen gas instead of evacuating to vacuum. An RF source which is conventionally used for electron acceleration, can be used to ignite the hydrogen plasma (e.g., at a lower power of an accelerator power source). This restores the performance of the N-UNCD:H film. The hydrogen can then be evacuated and vacuum restored.

Figure 13:
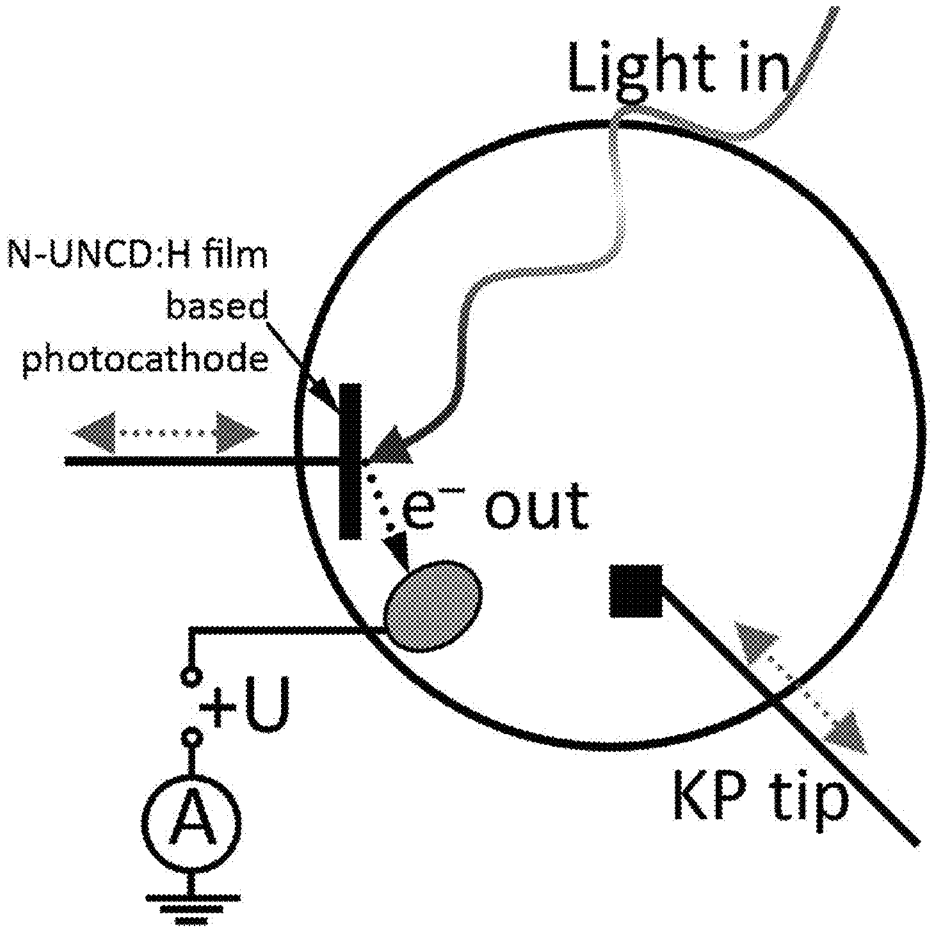
FIG. 13 is a schematic illustration of a top view of a modified Kelvin probe chamber for measuring a work function and a quantum efficiency of photocathodes simultaneously.

FIG. 13 is a schematic illustration of a Kelvin probe (KP) instrument (KP6500 from McAllister Technical Service) for performing work function (WF) and quantum efficiency (QE) measurements on N-UNCD:H photocathodes. The KP instrument has custom modifications for measuring WF and QE of the N-UNCD:H photocathode in the same experimental run.

N-UNCD:H photocathodes were formed using a variation of the method 300. An N-UNCD film was formed on a steel substrate which includes a polycrystalline molybdenum layer disposed thereon using a substantially similar method used to form the field emitter of FIG. 3 and therefore not described in further detail herein. The N-UNCD film had a thickness of about 150 nm. A carrier concentration of the N-UNCD film was about $10^{20}$ per $cm^3$. The N-UNCD film disposed on the polycrystalline molybdenum was H terminated in the same MPCVD chamber which was used to grow the N-UNCD film on the stainless steel/molybdenum substrate. The substrate was heated and maintained at a temperature of about 750 degrees Celsius. Hydrogen gas at a flow rate of about 200 sccm was introduced into the chamber and the pressure was maintained at a pressure of about 15 Torr. The N-UNCD film was exposed to a microwave plasma at a frequency of about 915 MHz and a power of about 2 kW for about 15 minutes to yield the N-UNCD:H film on the polycrystalline molybdenum layer and form the photocathode. The photocathode was allowed to cool down to room temperature in the synthesis chamber.

Before or after termination, all samples were taken from the MPCVD chamber and transported to the KP instrument chamber under ambient conditions. Total exposure time in ambient air was about 2 hours. The KP chamber was evacuated during all measurements to a base pressure of about $10^{-5}$-$10^{-6}$ Torr. A voltage of +300V was applied to a small aluminum anode plate, and a current of photoelectrons to the ground was collected by the same source/ammeter (Keithley 6487) with a threshold sensitivity of about ±10 femtoAmps.

Figure 14:
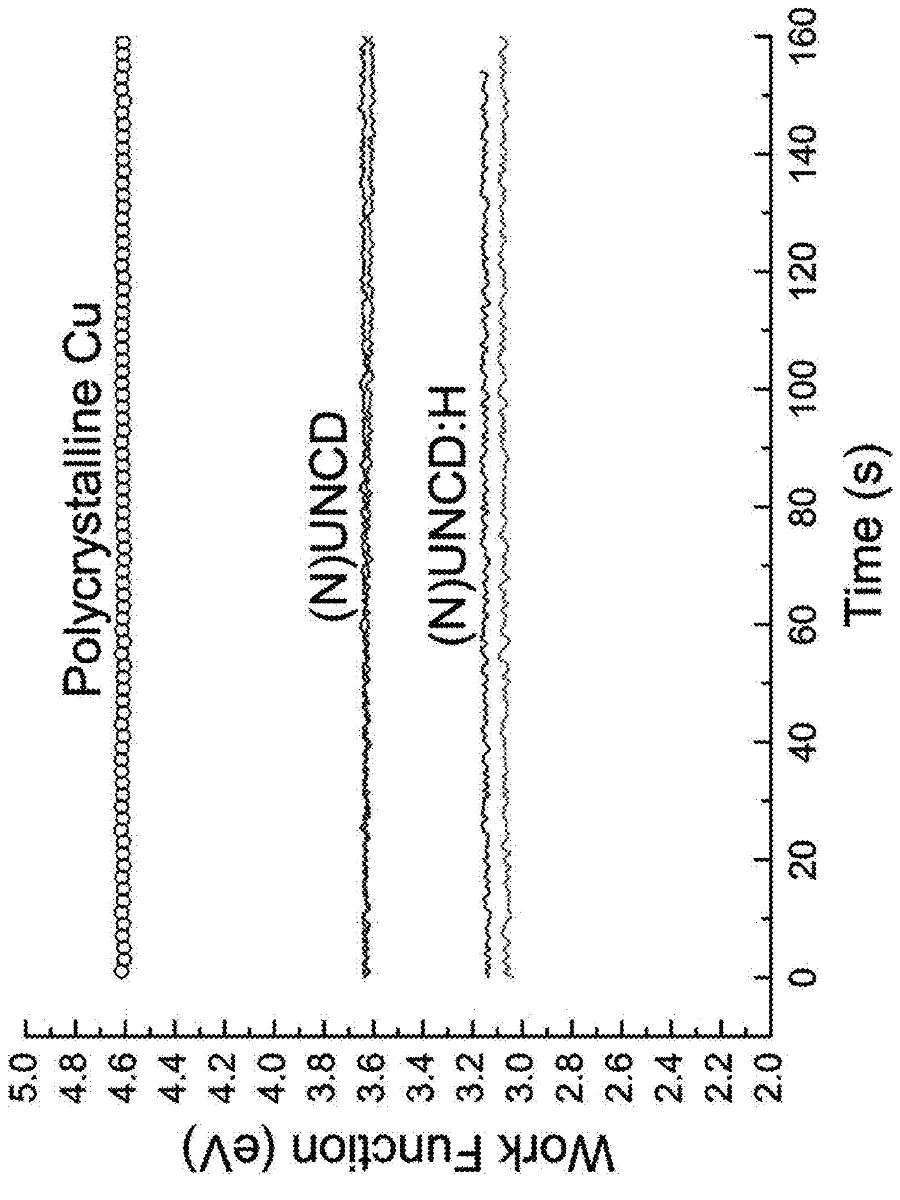
FIG. 14 is a plot of work function measurements of a polycrystalline copper surface as a reference, a N-UNCD film and a N-UNCD:H film.

The anode plate was introduced into the KP chamber at an angle such that it did not interfere with the light beam and the tip measuring the WF. The sample holder actuator and the KP tip are both retractable, such that ideal positions can be found for QE and WF measurements independently. The WFs for N-UNCD films were determined by the KP with respect to its calibrated tip (WF=4.6 eV) before and after N-UNCD film underwent hydrogen plasma treatment. A sample holder made of standard polycrystalline copper was used as a reference. All deduced WF values are plotted in FIG. 14. WF dependence on time is a standard representation for KP to estimate the signal's noise and drift with respect to time and get a confident measurement of a WF. As seen in FIG. 14, the WFs of the N-UNCD:H films were lower than the WFs of the plain N-UNCD film and the polycrystalline copper reference.

QE measurements were performed using an arc broadband Hg lamp (Spectra-Physics/Newport Oriel Instruments series 66900) as a light source. A light spot size from the source was adjusted by an aperture and focused by a lens. The spot size on the N-UNCD film surface was about 1 $mm^2$. A number of filters were used to define a spectral dependence of N-UNCD QE before and after hydrogen termination, namely 254, 313, 365, 405, and 436 nm. The output power of the lamp P(λ) at each filtered wavelength was assessed by a calibrated power meter (Ophir Nova II), equipped with a calibrated photodiode (Ophir PD300-UV). The photoelectron current $I_{photo}(\lambda)$ was recorded at each wavelength. QEs were calculated as:

$$QE(\lambda) = \frac{N_{electrons}(\lambda)}{N_{photons}(\lambda)}$$

where number of electrons $N_{electrons}(\lambda)$ per second is $I_{photo}(\lambda)/e$, and number of photons per second $N_{electrons}(\lambda)$ is P(λ) [eV/s]/(hυ) [eV] with e being the elementary electron charge and hυ being a single photon energy. Moreover, $$P(\lambda)\ [eV/s]=P(\lambda)\ [W]/e \text{ and } h\upsilon\ [eV]=1240/\lambda\ [nm].$$

$I_{photo}(\lambda)$ [Amps] and P(λ) [W]/ are experimentally measured quantities. All numbers are compiled and plotted in FIG. 15.

Figure 15:
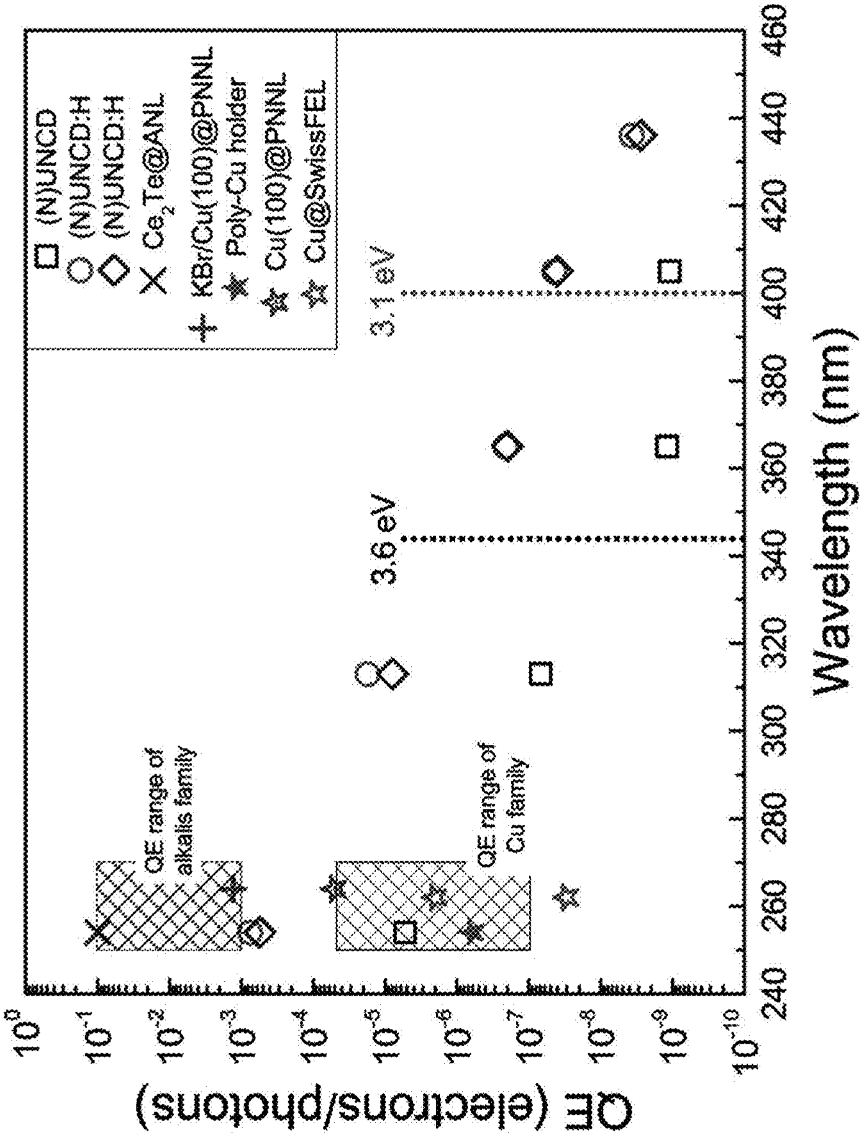
FIG. 15 is a plot of quantum efficiency measurements of N-UNCD films and N-UNCD:H films, relative to the quantum efficiency of other standard photocathode materials.

As seen in FIG. 15, the N-UNCD:H films has a sensitivity shifted toward near UV/visible wavelengths. There are two notable features in FIG. 15. The first feature is QE in the band 250-270 nm, which is of common interest to the photocathode community. QE of the N-UNCD film without H termination was about $5\times10^{-6}$. Given the measured WF of 3.6 eV, this is a quite moderate effect compared to the single crystal copper (100) which has a QE of about $5\times10^{-5}$ and a WF=4.2 eV. However, the QE was enhanced by a factor of 140 upon H-termination, placing N-UNCD:H at the low boundary of a QE range of alkali-based photocathodes.

Furthermore, the N-UNCD:H films were responsive in visible blue light. KP results show that in all cases, the photoemission was in the sub-WF regime. This can be explained by enhanced emission from grain boundaries with a lowered WF, caused by the local environment, accounted also for strong field emission from flat polycrystalline N-UNCD:H surfaces. Photoemission from N-UNCD:H in visible blue at 405 nm is possibly a regular threshold process and correlates to a photon energy of 3.06 eV versus WF 3.07±0.01 eV and 3.15±0.01 eV as determined by KP measurements. In any of the two regimes, incorporation of nitrogen leads to sustainable currents of about 10 pA from N-UNCD:H surfaces using blue light.

Thus, the N-UNCD:H photocathodes can provide stable and robust cathodes which are operable in both the UV and visible regimes. Furthermore, the N-UNCD:H photocathodes can be operable at much higher pressures than conventional photocathodes, for example up to pressures of about $10^{-5}$ Torr, while providing the QE and WF comparable with conventional alkali photocathodes performing exclusively only in ultrahigh vacuum.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. A method of forming a field emitter, comprising:
disposing a first layer on a substrate;
seeding the first layer with nanodiamond particles;
maintaining the substrate with the seeded first layer disposed thereon at a first temperature and a first pressure in a mixture of gases, the mixture including nitrogen; and
exposing the first layer to a microwave plasma to form a nitrogen doped ultrananocrystalline diamond film on the first layer, the nitrogen doped ultrananocrystalline diamond film having a percentage of nitrogen in the range of about 0.05 atom % to about 0.5 atom %,
wherein, the field emitter has about $10^{12}$ to about $10^{14}$ emitting sites per $cm^2$.

2. The method of claim 1, wherein the first layer includes a transition metal.

3. The method of claim 2, wherein the first layer includes at least one of molybdenum and niobium.

4. The method of claim 1, wherein the first temperature is in the range of about 650 degrees Celsius to about 950 degrees Celsius.

5. The method of claim 1, wherein the first pressure is in the range of about 40 Torr to about 70 Torr.

6. The method of claim 1, wherein the substrate is at least one of planar, microstructured and nanostructured.

7. The method of claim 5, wherein the substrate includes stainless steel.

8. The method of claim 5, wherein the substrate is planar and wherein the nitrogen doped ultrananocrystalline diamond film has a current density in the range of about 0.1 $mAmp/cm^2$ to about at least 25 $mAmp/cm^2$ between an electric field gradient of about 45 MV/m to about 65 MV/m, respectively.

9. The method of claim 1, wherein the nitrogen doped ultrananocrystalline diamond film has a beam emittance in the range of about 0.5 mm×mrad/mm-rms to about 3 mm×mrad/mm-rms at 65 MV/m.

10. The method of claim 1, wherein the nitrogen doped ultrananocrystalline diamond film has a full width half maximum longitudinal energy spread of about 0.5% to about 1%.

11. A method of forming a photocathode, comprising:
disposing a first layer on a substrate;
seeding the first layer with nanodiamond particles;
maintaining the substrate with the seeded first layer disposed thereon at a first temperature and a first pressure in a mixture of gases, the mixture including nitrogen;
exposing the first layer to a microwave plasma to form a nitrogen doped ultrananocrystalline diamond film on the first layer, the nitrogen doped ultrananocrystalline diamond film having a percentage of nitrogen in the range of about 0.05 atom % to about 0.5 atom %;
maintaining the nitrogen doped ultrananocrystalline diamond film at a second temperature and second pressure in hydrogen gas; and
exposing the nitrogen doped ultrananocrystalline diamond film to a microwave plasma to hydrogen terminate the nitrogen doped ultrananocrystalline diamond film.

12. The method of claim 11, wherein the first layer includes a transition metal.

13. The method of claim 11, wherein the first temperature is in the range of about 650 degrees Celsius to about 950 degrees Celsius.

14. The method of claim 11, wherein the first pressure is in the range of about 40 Torr to about 70 Torr.

15. The method of claim 11, wherein the substrate is stainless steel.

16. The method of claim 11, wherein the hydrogen terminated nitrogen doped ultrananocrystalline diamond film has a quantum efficiency of at least $5\times10^{-8}$ electrons/photons between a visible wavelength range of about 405 nm to about 436 nm, respectively.

17. The method of claim 11, wherein the hydrogen terminated nitrogen doped ultrananocrystalline diamond film has a quantum efficiency of at least $10^{-3}$ electrons/photons at wavelengths in the range of about 240 nm to about 270 nm.

18. The method of claim 11, further comprising:
operating the photocathode until a performance of the photocathode is depleted; and
exposing the photocathode to an hydrogen plasma to restore the performance of the photocathode.

19. A field emitter, comprising:
a planar substrate;
a first layer disposed on the planar substrate; and
a nitrogen doped ultrananocrystalline diamond film disposed on the first layer, the nitrogen doped ultrananocrystalline diamond film having a percentage of nitrogen in the range of about 0.05 atom % to about 0.5 atom %,
wherein, the field emitter has about $10^{12}$ to about $10^{14}$ emitting sites per $cm^2$.

20. The field emitter of claim 19, wherein the nitrogen doped ultrananocrystalline diamond film has a current density in the range of about 0.3 $mAmp/cm^2$ to about 25 $mAmp/cm^2$ at an electric field gradient of about 45 MV/m to about 65 MV/m, respectively.

21. The field emitter of claim 19, wherein the nitrogen doped ultrananocrystalline diamond film has a beam emittance in the range of about 0.5 mm×mrad/mm-rms to about 3 mm×mrad/mm-rms.

22. The field emitter of claim 19, wherein the nitrogen doped ultrananocrystalline diamond film has a full width half maximum longitudinal energy spread of about 0.5% to about 1%.

23. The field emitter of claim 19, wherein the field emitter is operable via a radio frequency energy source.

24. The field emitter of claim 19, wherein the planar substrate is formed from stainless steel.

25. A photocathode, comprising:
a substrate;
a first layer disposed on the substrate; and
a hydrogen terminated nitrogen doped ultrananocrystalline diamond film disposed on the first layer, the hydrogen terminated nitrogen doped ultrananocrystalline diamond film having a percentage of nitrogen in the range of about 0.05 atom % to about 0.5 atom %,
wherein, the photocathode has about $10^{12}$ to about $10^{14}$ emitting sites per $cm^2$.

26. The photocathode of claim 25, wherein the hydrogen terminated nitrogen doped ultrananocrystalline diamond film has a quantum efficiency in the range of about $5\times10^{-8}$ electrons/photons to about $5\times10^{-9}$ electrons/photons between a visible wavelength range of about 405 nm to about 436 nm, respectively.

27. The photocathode of claim 26, wherein the hydrogen terminated nitrogen doped ultrananocrystalline diamond film has a quantum efficiency of about $10^{-3}$ electrons/photons at wavelengths in the range of about 240 nm to about 270 nm.

28. The photocathode of claim 26, wherein the photocathode is operable at a pressure of up to about $10^{-5}$ Torr.

29. The photocathode of claim 26, wherein the nitrogen doped ultrananocrystalline diamond film is terminated with deuterium.

* * * * *